(12) United States Patent
Yasnoff

(10) Patent No.: US 11,477,144 B1
(45) Date of Patent: Oct. 18, 2022

(54) COMMUNICATION SYSTEMS WITH MESSAGE INTERVENTION AND CRM INTEGRATION

(71) Applicant: SendSmart, Inc., Portland, OR (US)

(72) Inventor: David Yasnoff, Portland, OR (US)

(73) Assignee: SendSmart, Inc., Portland, OR (US)

( * ) Notice: Subject to any disclaimer, the term of this patent is extended or adjusted under 35 U.S.C. 154(b) by 0 days.

(21) Appl. No.: 16/679,188

(22) Filed: Nov. 9, 2019

Related U.S. Application Data

(60) Provisional application No. 62/758,468, filed on Nov. 9, 2018.

(51) Int. Cl.
| | |
|---|---|
| *H04L 51/046* | (2022.01) |
| *G06Q 30/00* | (2012.01) |
| *H04L 51/08* | (2022.01) |
| *G06Q 50/00* | (2012.01) |

(52) U.S. Cl.
CPC ......... *H04L 51/046* (2013.01); *G06Q 30/016* (2013.01); *G06Q 50/01* (2013.01); *H04L 51/08* (2013.01)

(58) Field of Classification Search
CPC .... G06Q 30/016; G06Q 50/01; H04L 51/046; H04L 51/08
See application file for complete search history.

(56) References Cited

U.S. PATENT DOCUMENTS

| | | | | |
|---|---|---|---|---|
| 7,275,083 | B1* | 9/2007 | Seibel | G06Q 30/02 705/14.39 |
| 2005/0044036 | A1* | 2/2005 | Harrington | G06Q 30/0601 705/38 |
| 2012/0005102 | A1* | 1/2012 | McClung | G06Q 30/0615 705/80 |
| 2014/0081913 | A1* | 3/2014 | Peri | G06Q 50/01 707/610 |
| 2016/0212266 | A1* | 7/2016 | Soundar | H04M 3/51 |
| 2017/0180284 | A1* | 6/2017 | Smullen | H04L 69/14 |
| 2019/0347668 | A1* | 11/2019 | Williams | G06V 30/418 |
| 2020/0014642 | A1* | 1/2020 | Sidi | H04M 3/5191 |
| 2020/0065857 | A1* | 2/2020 | Lagi | G06N 7/005 |

\* cited by examiner

*Primary Examiner* — Tonia L Dollinger
*Assistant Examiner* — Jonathan A Sparks
(74) *Attorney, Agent, or Firm* — Fenwick & West LLP

(57) ABSTRACT

A method may include receiving a message having lead information, initiating a conversation with a prospect identified in the lead information, and sending a modified version of the message to a CRM system, wherein the modified version of the message includes information about the conversation. The information about the conversation may include a hyperlink to the conversation in a messaging platform. The method may further include assigning the prospect identified in the lead information to a representative. The modified version of the message may identify the representative. The representative may be identified by sender information in the modified message. The conversation may include a message to the prospect identified in the lead information. The message to the prospect may be automatically personalized to the prospect. The message having lead information may be intercepted between a lead source and a CRM system.

20 Claims, 28 Drawing Sheets

OPT OUT / UNSUBSCRIBE RULES

[ NEW ] [ DELETE ]

| NAME | CONDITION |
| --- | --- |
| STOP | STARTS WITH |
| **** | CONTAINS |
| REMOVE | STARTS WITH |
| UNSUBSCRIBE | EQUALS |
| PLEASE UNSUBSCRIBE | CONTAINS |
| TAKE ME OFF YOUR LIST | STARTS WITH |
| **** | STARTS WITH |
| ***** | STARTS WITH |
| ****** | CONTAINS |
| DO NOT CONTACT ME | STARTS WITH |
| ** | CONTAINS |
| DELETE ME FROM YO... | CONTAINS |
| I WILL FILE HARASSM... | CONTAINS |
| DON'T CALL ME OR TEX... | CONTAINS |
| DISCARD MY NUMBER | STARTS WITH |
| U CAN *** | STARTS WITH |
| DON'T SEND THIS ANY... | STARTS WITH |
| NO STOP TEXTING ME | CONTAINS |
| NO. STOP SENDING ME... | STARTS WITH |
| NO MOTHER ****** | STARTS WITH |
| PLEASE CANCEL ME... | STARTS WITH |
| PLS TAKE ME OFF UR LIST | STARTS WITH |
| PLEASE REMOVE ME | STARTS WITH |
| PLEASE DO NOT TEXT | STARTS WITH |
| NO MORE TEXT MSGS | CONTAINS |
| PELASE TAKE ME OFF | STARTS WITH |
| PLEASE DON'T TEXT | STARTS WITH |
| PLEASE TAKE MY NU... | STARTS WITH |
| TAKE MY NUMBER O... | CONTAINS |
| I WOULD LIKE TO BE T... | CONTAINS |
| DO NOT CONTACT | |

FIG. 9

| PROMOTER | EVENT 1 | EVENT 2 | EVENT 3 |
|---|---|---|---|
| TRAVIS | http://bit.ly/Ufn2zd1 | http://bit.ly/Ufn2zd2 | http://bit.ly/Ufn2zd3 |
| JOHN | http://bit.ly/Ufn0qs1 | http://bit.ly/Ufn0qs2 | http://bit.ly/Ufn0qs3 |
| JAMIE | http://bit.ly/SYOODF1 | http://bit.ly/SYOODF2 | http://bit.ly/SYOODF3 |
| ANDREA | http://bit.ly/RrcicG1 | http://bit.ly/RrcicG2 | http://bit.ly/RrcicG3 |
| BRANDON | http://bit.ly/SYOODJ1 | http://bit.ly/SYOODJ2 | http://bit.ly/SYOODJ3 |

FIG. 10

| WEB LANDING PAGE | INSERT URL ⌄ | INSERT MAIL MERGE ⌄ |

You have been invited to sign up for a private sales event at County Auto on Friday at 6:00 PM. Please enter your first and last name and a number for text messaging to confirm.

| WEB CONFIRMATION PAGE | INSERT URL ⌄ | INSERT MAIL MERGE ⌄ |

Thank you for your submission. Please check your phone for a text message confirmation. Use the links below to share the invitation with your friends. Space is limited, so the invitation will only remain open for a limited time.

| SMS CONFIRMATION MESSAGE | INSERT URL ⌄ | INSERT MAIL MERGE ⌄ |

You are confirmed for a private sale at County Auto on <date:10>. Share this link with friends to invite them to sign up <http://bit.ly/Ufn2zD1>.

| TWITTER SHARE MESSAGE | INSERT URL ⌄ | INSERT MAIL MERGE ⌄ |

I just signed up for a private auto sale! Join me <http://bit.ly/Ufn2zD1>.

| EMAIL SHARE MESSAGE | INSERT URL ⌄ | INSERT MAIL MERGE ⌄ |

I just signed up for a private auto sale at County Auto on <date:10>! Join me <http://bit.ly/Ufn2zD1>.

| FACEBOOK SHARE MESSAGE | INSERT URL ⌄ | INSERT MAIL MERGE ⌄ |

I just signed up for a private auto sale! Join me <http://bit.ly/Ufn2zD1>.

FIG. 13

COUNTY AUTO SALES EVENT 1

[INVITES/STATS]
[EDIT DETAILS]

| ATTENDEE | PROMOTER | GUESTS | | |
|---|---|---|---|---|
| Arrozal, Marc | Andrea | 2/4 | − | + |
| Ashley, Jacob | Andrea | 0/4 | − | + |
| Bever, Shani | Andrea | 0/2 | − | + |
| Bryant, Teal | Andrea | 1/4 | − | + |
| Cain, Sean | Travis | 0/4 | − | + |
| Clymer, Lindsay | Andrea | 0/3 | − | + |
| Craemer, McKenzie | Andrea | 0/4 | − | + |
| Dawson, Danielle | Travis | 0/1 | − | + |
| Fish, Chris | Travis | 0/3 | − | + |
| Gearhart, Tiffanee | Travis | 0/4 | − | + |
| Gibson, Courtenay | Travis | 0/2 | − | + |

FIG. 14

COUNTY AUTO
SALES EVENT 1 STATS

| PROMOTER | URL | DIRECT ARRIVALS | DIRECT GUESTS | DIRECT SIGN UPS | SHARED ARRIVALS | SHARED GUESTS | SHARED SIGN UPS |
|---|---|---|---|---|---|---|---|
| TRAVIS | http://bit.ly/Ufn2zd1 | 14 | 47 | 20 | 4 | 47 | 20 |
| JOHN | http://bit.ly/Ufn0qs1 | 2 | 7 | 2 | 0 | 7 | 2 |
| JAMIE | http://bit.ly/SY0ODF1 | 0 | 0 | 0 | 0 | 0 | 0 |
| ANDREA | http://bit.ly/RrcicG1 | 20 | 48 | 14 | 3 | 48 | 14 |
| BRANDON | http://bit.ly/SY0ODJ1 | 0 | 0 | 0 | 0 | 0 | 0 |
| TOTAL | | 36 | 102 | 36 | 7 | 102 | 36 |

FIG. 15

COMMUNICATION SYSTEMS WITH MESSAGE INTERVENTION AND CRM INTEGRATION

CROSS-REFERENCE TO RELATED APPLICATIONS

This application claims priority from and the benefit of U.S. Provisional Patent Application No. 62/758,468 filed Nov. 9, 2018 titled "Communication Systems with Message Intervention and CRM Integration" which is incorporated by reference.

BRIEF DESCRIPTION OF THE DRAWINGS

FIG. 9 illustrates an embodiment of a screen for managing opt out rules in a dynamic messaging service according to some inventive principles of this patent disclosure.

FIG. 10 illustrates an embodiment of specific landing pages for different promoters and different events according to some inventive principles of this patent disclosure.

FIG. 13 illustrates an embodiment of a screen for pre-populating landing page messages and sharing messages according to the inventive principles of this patent disclosure.

FIG. 14 illustrates an embodiment of a system for tracking how many message recipients have opted in to promotions for each promoter according to the inventive principles of this patent disclosure.

FIG. 15 illustrates an embodiment of a system for providing analytics on an event according to the inventive principles of this patent disclosure.

DETAILED DESCRIPTION

The constantly growing and evolving forms of electronic communications have great potential to help businesses reach consumers. Email, text messaging, and social media have opened up powerful new channels for business to send messages to customers. But much of this potential has been unrealized because of impediments to effective use, and in some cases it has been squandered by overuse or misuse. The communication ecosystem is vast and sprawling, and the impediments or "friction" points affect all participants including the businesses that send messages, the consumers that receive them, the message service providers (MSPs) that operate messaging platforms, and the social media platforms that provide additional messaging channels. The inventive principles of this patent disclosure are directed to solutions that alleviate this friction and enable more effective use of electronic messaging.

One example of a friction point is the use of multiple channels such as email and text messaging to communicate with customers. This creates "silos" of data and functionality, so the business has to implement multiple systems for communicating with consumers through the multiple channels.

Another important friction point is the impersonal nature of most commercial electronic messaging. This is especially problematic with conventional text messaging promotions that use short codes because the use of short codes make it virtually impossible for consumers to send messages back to the business. Research shows that consumers are more receptive to communicating with a business if the interactions are like two-way, personal conversations about things that matters to them. One of the main reasons consumers op out or unsubscribe from communications is that the messages are simply not relevant. But conventional messaging techniques rely on frequent message blasts to numerous consumers. There have been some efforts to customize messages by including the recipient's name in the body of the message and to target the messages to relevant consumers, but these efforts have been cumbersome to implement and largely ineffective.

Unified Messaging Platform

Some of the inventive principles of this patent disclosure provide a unified messaging platform that enables a business to communicate with consumers through multiple channels using a single interface. This platform also enables a business to easily implement targeted micro marketing campaigns that facilitate two-way personal conversations between the business and the consumer on topics that are relevant to the consumer.

Figure 1:
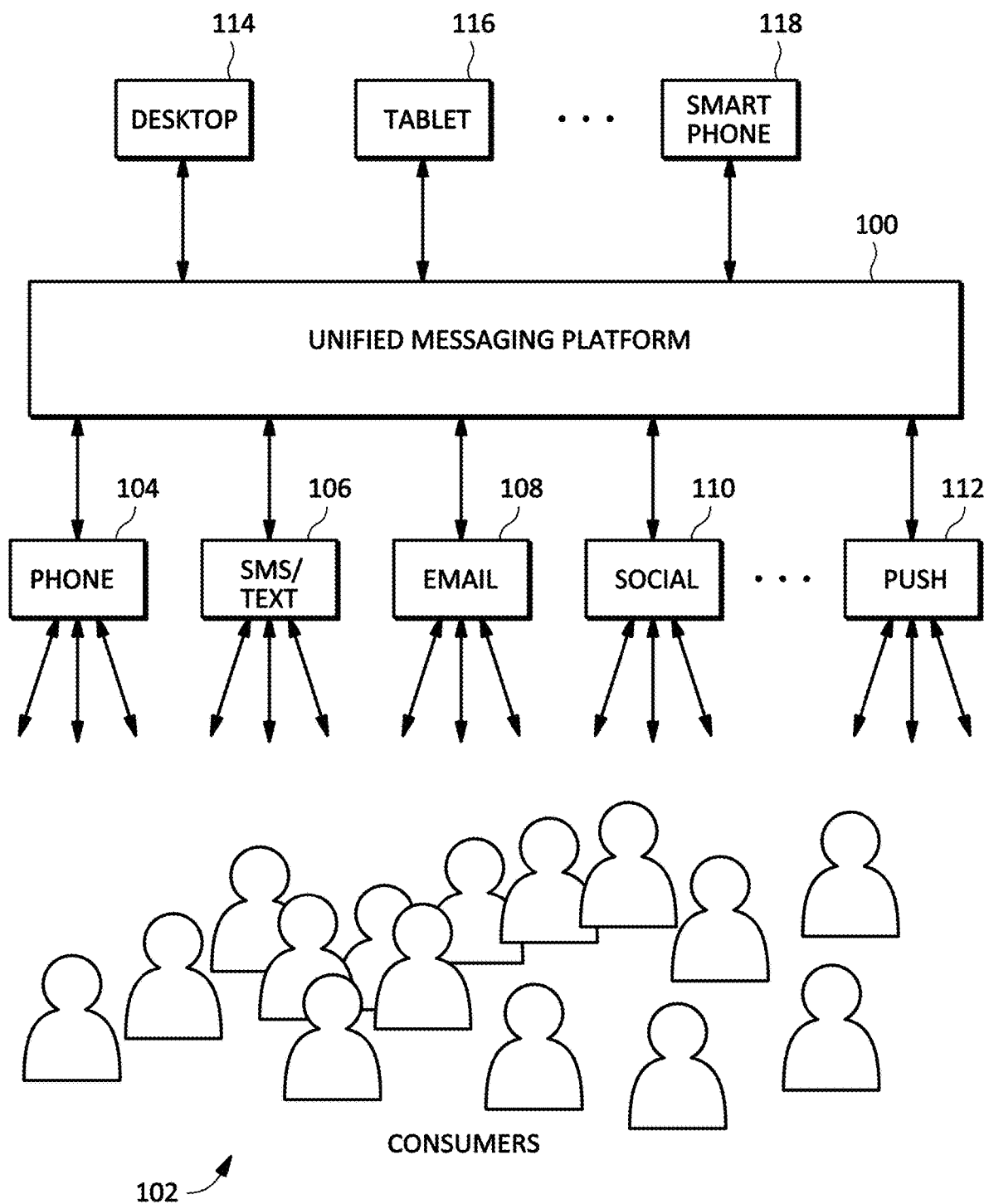
FIG. 1 illustrates an embodiment of a messaging system according to the inventive principles of this patent disclosure.

FIG. 1 illustrates an embodiment of a messaging system according to the inventive principles of this patent disclosure. The embodiment of FIG. 1 includes a unified messaging platform 100 that may include any of the messaging functionality described in this disclosure. The unified messaging platform 100 enables a business to communicate with consumers 102 through various messaging platforms such as platforms for phone 104 (e.g., Skype, Google Voice, etc.), text 106 (e.g., Google Voice, ifbyphone, etc.), email 108 (e.g., Constant Contact, Mail Chimp), social sharing and networking 110 (e.g., Facebook, Twitter, Google+, LinkedIn, etc.), mobile applications that use push notifications 112, as well as other messaging platforms not illustrated here such as instant messaging services. In this embodiment, the unified messaging platform 100 is implemented as software as a service (SaaS), but it could also be implemented as a native application for desktop or notebook computers, tablets, smart phones, etc., or in any other suitable manner.

In this SaaS implementation, the business can access all of the functionality of the unified messaging platform 100 through any Internet connected device such as a desktop computer 114, notebook or tablet computer 16, smart phone 118, etc.

The unified messaging platform 100 enables a business user to view and manage all incoming and outgoing messages on all channels (platforms) 104-112 through a single user interface. The same user interface may also be used to launch and manage messaging campaigns on any channel or on a hybrid combination of channels simultaneously. The unified messaging platform 100 enables a business user to import consumer contact information from every messaging platform that is interfaced to the system, as well as from other sources such as comma separated variable (CSV) files, again through the same user interface. The contact information may be combined, organized, reidentified, enriched and processed in other ways to eliminate duplicates and provide a more personal view of each consumer.

This unified multi-channel messaging platform is not simply a combination of individual messaging capabilities. By integrating multi-channel business-consumer communications into a single platform, substantial ease-of-use and efficiency improvements are possible for businesses. Even more importantly, communications with consumers can be managed both individually and in groups to ensure recipient satisfaction and maximum effectiveness through better user identification, tailoring messages to ensure consumer interest, and communicating with consumers using whatever modality they choose at any particular time.

Platform Architecture

Figure 2:
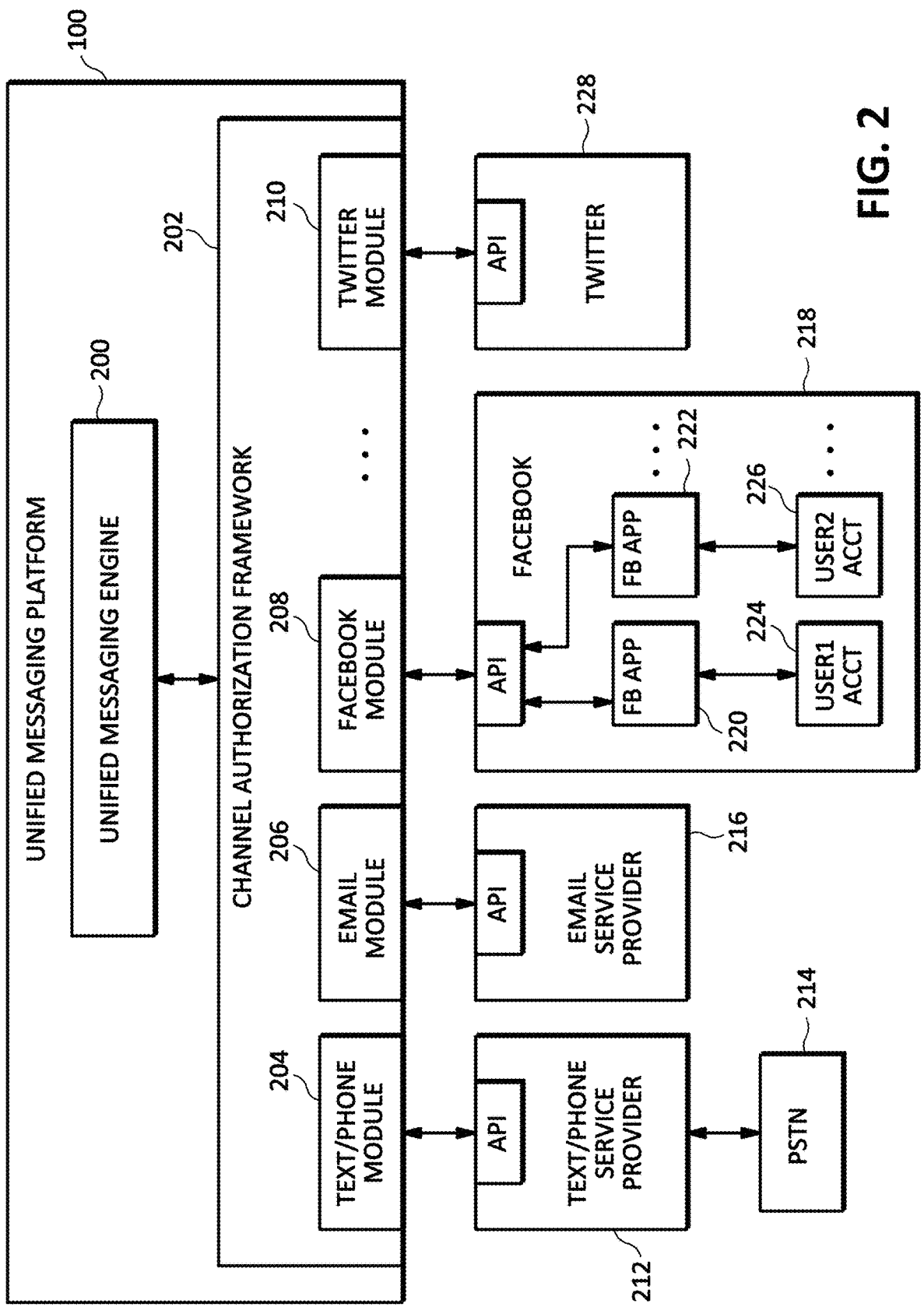
FIG. 2 illustrates one possible implementation architecture for a unified messaging platform according to the inventive principles of this patent disclosure.

FIG. 2 illustrates one possible implementation architecture for a unified messaging platform according to the inventive principles of this patent disclosure. The platform 100 includes a unified messaging engine 200 that includes logic to transmit and receive messages, implement rules for metering and modifying message delivery and content, enrich contact data, and perform various other functions as described in more detail below. The messaging engine 200 interacts with the various messaging platforms through a channel authorization framework 202 which utilizes channel authorization modules 204, 206, 208 and 210 to interface to text/phone service providers 212, email service providers 216, Facebook 218 and Twitter 228, respectively, while presenting the messaging engine 200 a uniform interface regardless of which messaging platform (channel) is being accessed. The channel authorization modules may utilize OAuth1, OAuth2, OpenID, or any other suitable standard for authorizing access to platforms and resources.

Not all of the modules are necessary in every system, and additional modules may be included for other types of messaging platforms. Throughout this disclosure, Facebook and Twitter are used frequently as examples, but the inventive principles apply to any other sharing and messaging platforms such as Google+, LinkedIn, Pinterest, Meetup, etc. The use of a modular channel authorization framework enables additional channels to be added by simply adding additional modules rather than having to revise the framework.

Each module in the authorization framework 202 typically interfaces to its associated platform through an application programming interface (API) provided by the platform. The modules 204, 206, 208 and 210 typically communicate with associated service providers 212, 216, 218 and 228 through the Internet, but any other suitable method of communication may be used.

In this example, SMS (text) and phone service are both provided by the same provider 212 which enables the unified messaging platform 100 to send and receive messages over the public switched telephone network (PSTN) 214. The PSTN includes the entirely of all telephone lines, fiber optic cables, cellular phone networks, etc., that carry voice and text traffic as well as other types of data. The terms text message, SMS (short message service) and MMS (multimedia messaging service) are used interchangeably in this disclosure unless a distinction is apparent from context.

A business that signs up to use the unified messaging platform 100 may already have a service provider that it uses for text/phone messaging, in which case, the text/phone module 204 may be configured to access the business' preexisting provider by using the business' credentials or any suitable third party authorization scheme. Alternatively, the business may rely on the platform operator for a turnkey solution, in which case the platform operator may use a preferred text/phone messaging provider 212 to provide a phone number and set up a separate account for that business.

By integrating text/phone messaging into the unified messaging platform 100, all text messages and phone calls can be tracked and logged by the messaging engine 200 which can also enable each participant in a phone call to enter call notes into the system.

As with the text/phone module, the email module 206 may interface to a business' existing email service provider or to a preferred email service provider selected by the platform operator. The unified messaging platform 100 can send, receive and log all emails on behalf of the business through the API of the email service provider 216.

The unified messaging platform 100 may interface to the Facebook platform 218 through the Facebook API and by using one or more Facebook applications 220,222. In this example, the platform operator creates a separate Facebook application for each business' user account 224,226. A Facebook application enables the unified messaging platform 100 to access all of the business' Facebook contacts, messages, and other information. Authentication may be accomplished either by the business providing the platform operator with the business' user ID and password, or through a third party authorization scheme that provides a specific set of credentials that enables platform operator's Facebook application to access the business' Facebook account.

The use of a separate Facebook application for each business' user account provides compartmentalization that prevents errors or breaches in one account from affecting other accounts, but may be less efficient to implement. In other embodiments, the messaging platform operator may use a single Facebook application to access every business' user account.

The structure and operation of modules for Twitter and other platforms may be implemented in a similar manner to that described for Facebook.

Any of the components described in FIGS. 1 and 2 and throughout this patent disclosure may be implemented with any suitable combination of hardware, software, firmware, etc. In the examples described in this disclosure, the system is assumed to be implemented as software as a service (SaaS) or as a platform as a service (PaaS), but the inventive principles are not limited to any particular implementation details. In the examples described in this disclosure, the unified messaging platform 100 is assumed to be operated by a company referred to as the unified messaging platform operator (or the uniform platform operator, the platform operator, etc.), and the customers or clients of the platform operator are businesses that use the platform for messaging their customers (consumers). In other implementations, however, a business may operate the platform for its own use. A business may be any for profit, nonprofit or governmental organization, etc., and consumers refer to any patron or user of those organizations.

Importing Contact Data

Figure 3:
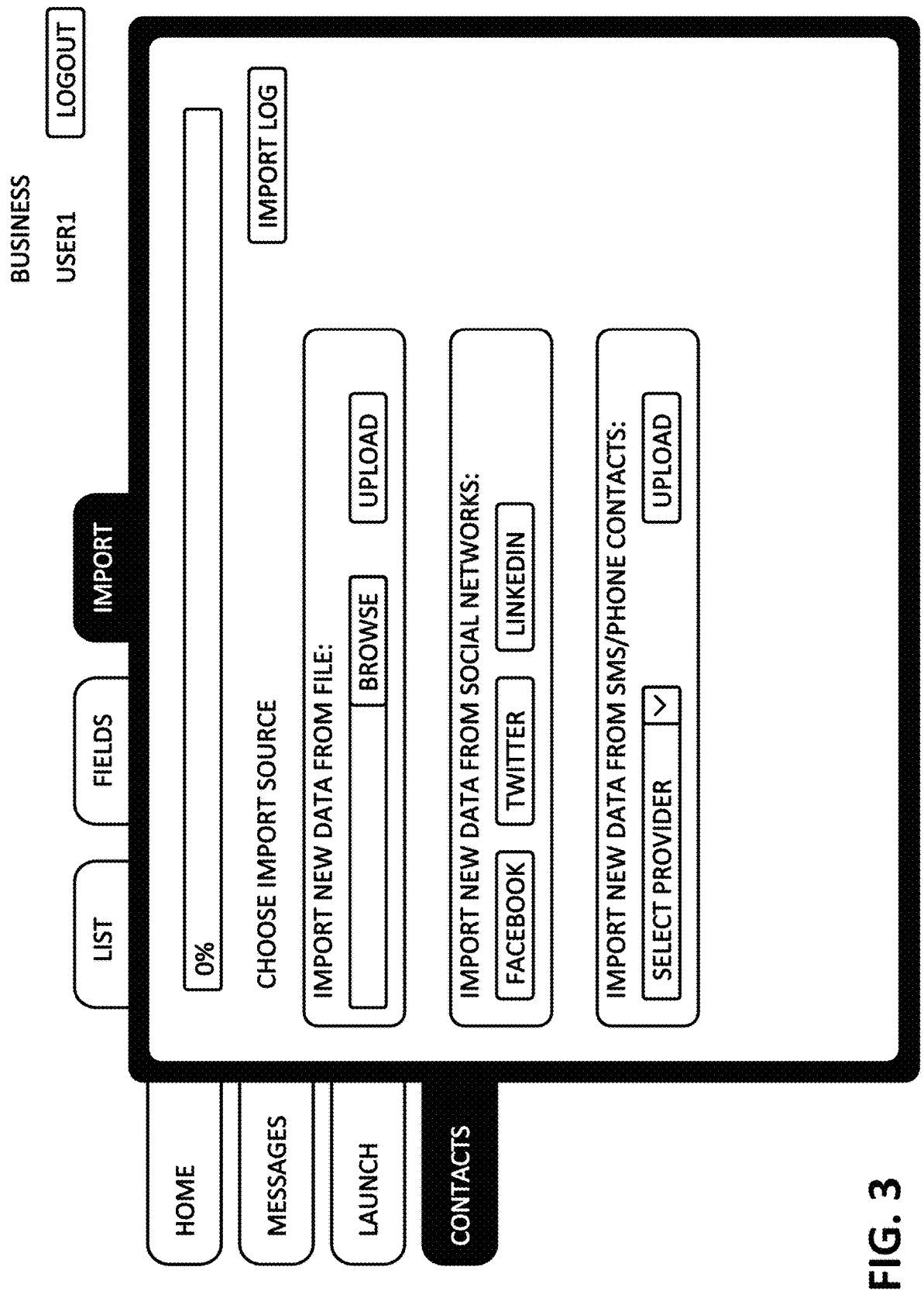
FIG. 3 illustrates how a user can import contact data from multiple messaging platforms and files according to the inventive principles of this patent disclosure.

FIG. 3 illustrates how a user can import contact data from multiple messaging platforms and files. Referring to FIG. 3, a dashboard for the unified messaging platform has four main buttons along the left side that select the main functions of the dashboard: HOME, MESSAGES, LAUNCH and CONTACTS. When one of the four main buttons is selected, the button becomes highlighted and any selection tabs that may be relevant to the selected main function appear along the top of the main window which is surrounded by a heavy black border in FIG. 3. In the case of the CONTACTS main function which is selected in this example, tabs for LIST, FIELDS and IMPORT appear along the top of the main window.

In this example the IMPORT tab is selected, so dialog boxes and other features relevant to importing contact information appear in the main window. One dialog box enables the user to import contact information from a file such as a CSV (comma separated variable) file. To import data from a file, the user navigates to the file using a browse feature, then clicks an UPLOAD button to upload data from the file.

Another dialog box enables the user to import contact information from any social media platform that has been enabled (using a setup feature accessed through the main HOME function button) by clicking on a button for the specific social network. The user is then presented with any additional dialog boxes or screens, if any, that may be required to upload contact information from the social network.

A third dialog box enables the user to import contact information from a phone and/or text messaging platform. The user selects the platform, e.g., Skype, Google Voice, etc., using the provider selector, then clicks the UPLOAD button to upload the data.

A progress bar at the top of the main window indicates the percentage of the current upload operation that has been completed. An IMPORT LOG button takes the user to a screen that displays the date, time, status, etc. of any import operations.

The LIST tab presents the user with a screen that provides a complete list of contacts and provides additional features that enable the user to add, search, view and edit contacts, and to create and run search filters which may be used when selecting contacts to target for a specific marketing campaign as described below.

The FIELDS tab presents the user with a screen that enables the user to view the currently available fields in each contact record, as well as to add, edit and delete additional fields. In one example embodiment, the standard or default contact fields include Birthdate, Email Address, Facebook UserID, Facebook Photo, First Name, Gender, Last Name, Notes, SMS Number, Twitter Handle and Twitter Photo.

Examples of additional fields that a user may add include preferred communication channel, favorite band or music, favorite restaurant or food, favorite color, shoe size, lease expiration date, address, employer, etc. Adding additional fields enables a business to send fewer messages but get better results by targeting specific consumers with personalized messages that are relevant to their interests, and by sending them in channels the consumers prefer, and at times that are more likely to yield results.

Data Enrichment

Figure 4:
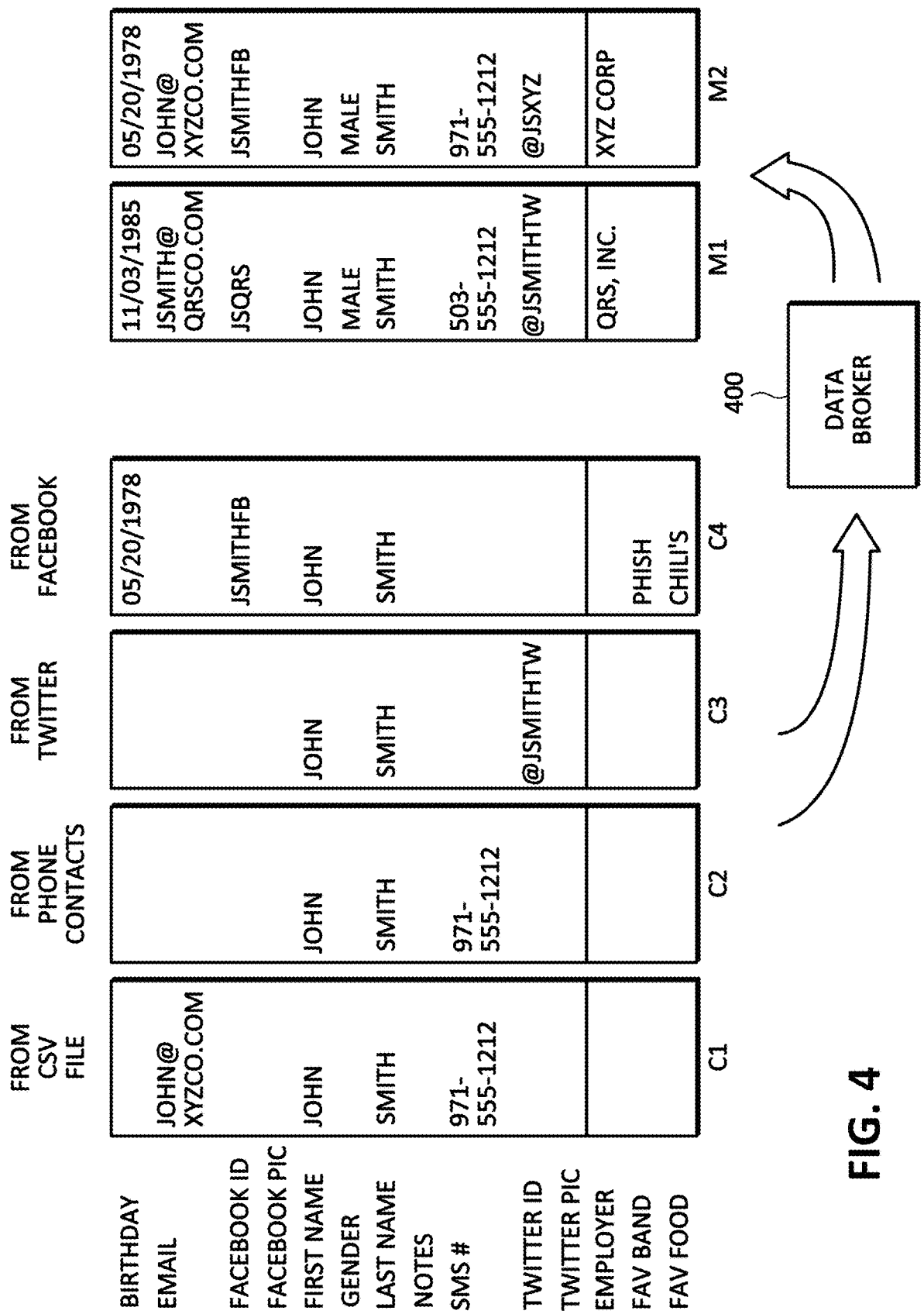
FIG. 4 illustrates an embodiment of a contact data enrichment method according to the inventive principles of this patent disclosure.

Some of the inventive principles of this patent disclosure relate to techniques for enriching contact data to eliminate duplicate contacts and help businesses send messages that are relevant to the recipients. Referring to FIG. 4, contact record C1 was imported from a CSV file, record C2 was imported through a phone contact list, record C3 was imported from Twitter, and record C4 was imported from Facebook. The top eight fields in each record are standard fields in the Contacts tab of the Unified Messaging Platform dashboard, while the bottom four fields are custom fields that have been added by the message sender. Each of the four records is sparsely populated, and the only fields that are the same for all four records are the first and last name. John Smith is a common name, so four records could conceivably reference four different people. However, records C1 and C2 have the same SMS number, so they clearly reference the same person. But there is not enough information to know if either of records C3 and C4 matches either of records C1 and C2.

To resolve the identities of the person(s) referenced by records C3 and C4, all four of the records are sent to a data broker 400. Examples of data brokers include Acxiom, Corelogic, Datalogix, eBureau, ID Analytics, etc. The data broker compares records C1 through C4 to an extensive database of consumer information and sends back records M1 and M2 which are more complete records that match data in records C1-C4. Record M2 enables the unified messaging engine to determine that record C4 appears to be a duplicate of C1 and C2 because of shared birthdays and SMS numbers. Likewise, record M1 enables the unified messaging engine to determine that record C3 probably refers to a different person than C1 and C2 because of a different Twitter handle.

The example of FIG. 4 illustrates the synergistic benefits of integrating different channels (messaging platforms) in a unified messaging platform. Every piece of data from any source dramatically reduces the chance of duplicate contacts and eliminates a friction point between a business and its consumers because consumers strongly dislike receiving too many messages. Moreover, accessing and utilizing data from multiple channels provides a richer data set that includes information such as birthdays, favorite music and restaurants, etc., that may be valuable for targeted micro marketing campaigns. For example, research shows that birthday messages are almost three times more likely to be read and six times more likely to generate revenue.

By adding the additional data from a data broker, a unified messaging engine according to the inventive principles of this patent disclosure creates an elaborate contact identity confirmation system that provides a robust, reliable contact list with rich data set that reduces friction and provides opportunities for a business to engage consumers with relevant messaging.

The contact records obtained through the elaborate contact identity confirmation process may be utilized in various ways depending on the specific details of a marketing campaign and consumer attitudes. For example, although birthday messages tend to have high response rates, they may be counter-productive if the message recipient did not provide birthday information through the specific channel being used. Thus, in the COMPOSE MESSAGE screen of FIG. 7 described below, the birthday field may be available for inserting into a message that is sent through Facebook (because the consumer may have provided that information to Facebook), but it may be unavailable, e.g., grayed out, for a message that is sent through SMS.

Some fields in each contact record may never be used in actual messaging, but are nonetheless useful to maintain for purposes of establishing matches between apparently duplicate contacts. For example, a contact's Facebook photo may never be used in a message, but it may be helpful to match a contact obtained through Facebook with a contact obtained through Twitter since users often upload the same photo for multiple channels.

New contact data may become available at various times, for example, when a business imports contact information from a newly added channel or updates contact information from an existing channel. New contact data from a data broker may also be obtained periodically, or whenever conflicting or incomplete data from other sources prevents accurate identification of one or more contacts. When new data sets become available, the unified messaging engine may give a business or other user the option to replace existing contact data with the entire new data set, manually sort through the new data to replace data on a contact-by-contact basis, or even decide on a field-by-field basis whether the new data is more accurate or complete than the existing data.

Launching Messaging Campaigns

Figure 5:
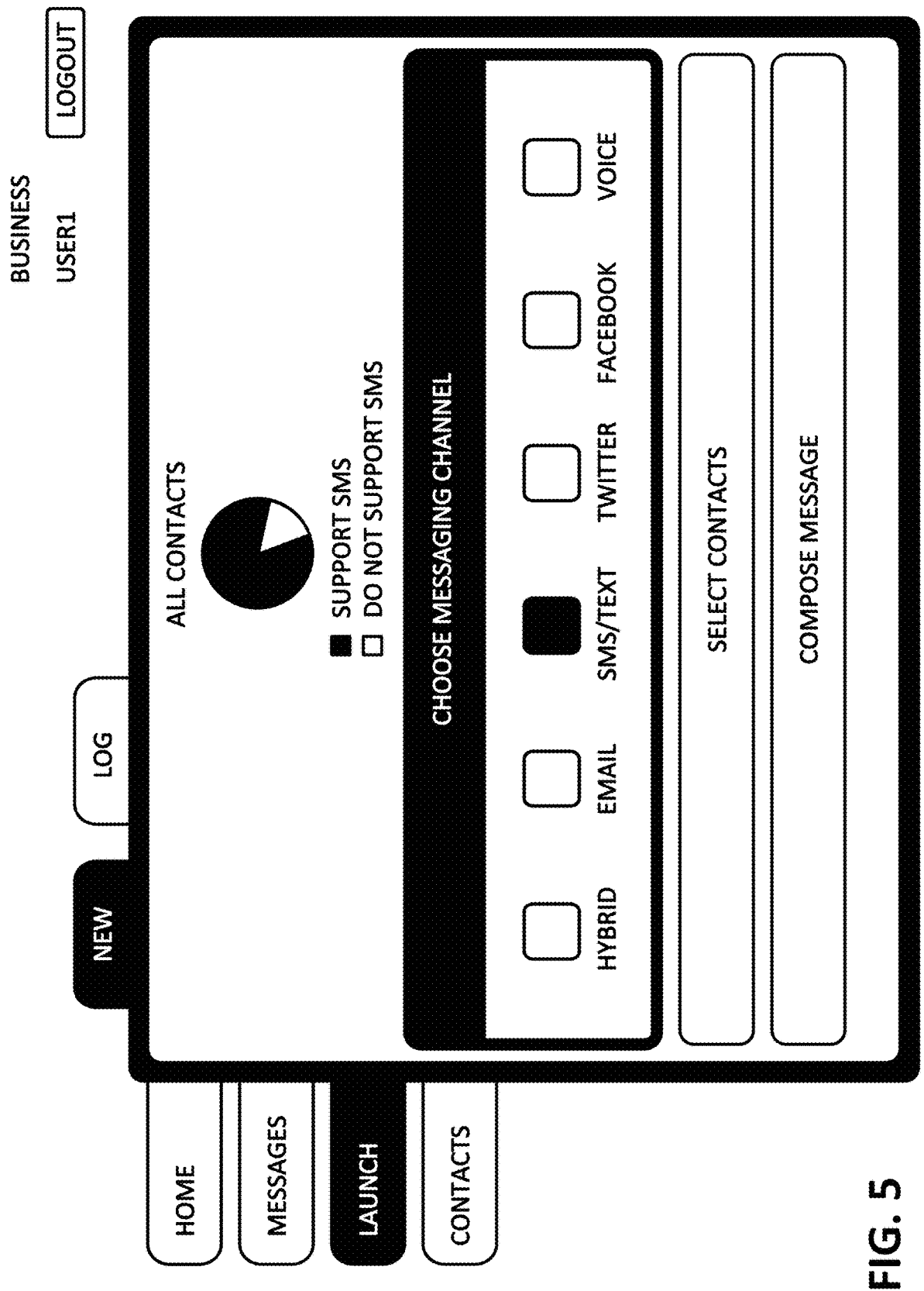
FIG. 5 illustrates a main launch menu and choose channels dialog box according to the inventive principles of this patent disclosure.

Once the contact information from any or all of the relevant channels has been imported, and optionally enriched, the user can begin launching marketing campaigns by clicking on the LAUNCH main menu button as shown in FIG. 5. When the main LAUNCH function is activated, NEW and LOG tabs appear at the top of the main window. In this example the NEW tab is selected, and the user is presented with three dynamic dialog boxes in the main window: CHOOSE MESSAGING CHANNEL, SELECT CONTACTS, and COMPOSE MESSAGE. A space at the top of the main window accommodates pie charts or other analytics that may be relevant at each step of the campaign launch process.

In the example of FIG. 5, the user has selected the CHOOSE MESSAGING CHANNEL dialog box which becomes highlighted and presents buttons for the various channels that have been enabled including phone, email, SMS/text, Twitter, Facebook and Voice, as well as an option for a Hybrid combination of channels. In this example the user has clicked the SMS/text button, so a pie chart is displayed showing the percentage of all contacts that support text messaging. The pie chart may be supplemented by displays of the absolute numbers of contacts that do and do not support text messaging.

Figure 6:
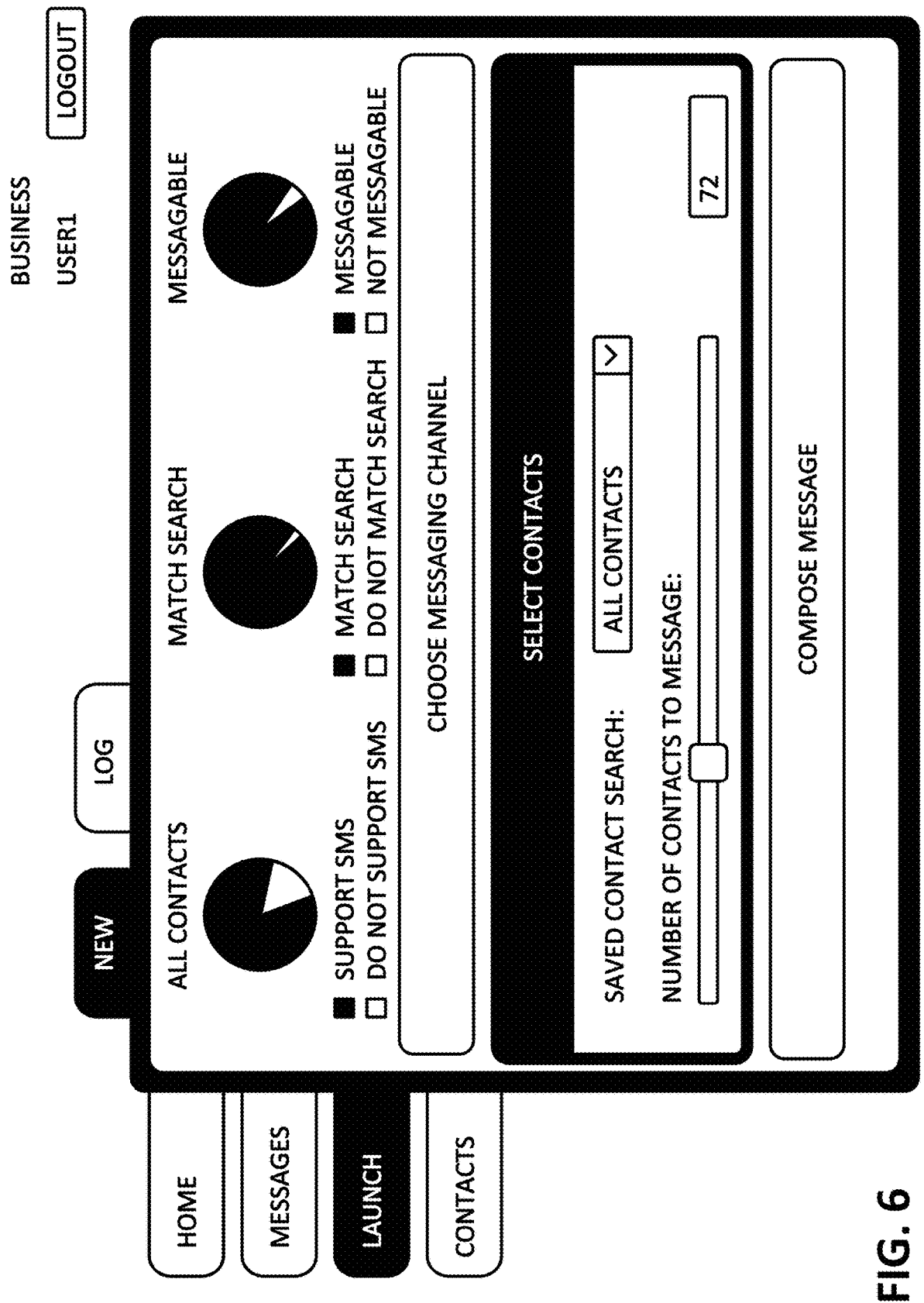
FIG. 6 illustrates a main launch menu and select contacts dialog box according to the inventive principles of this patent disclosure.

After selecting the messaging channel(s), the user proceeds to the SELECT CONTACTS dialog box as shown in FIG. 6. When selected, this dialog box expands and presents the user with a pull down selector to either begin with all contacts as shown here or select a previously saved search. The system then displays two additional pie charts and analytics at the top of the main window: one that displays the percentage and/or number of contacts that match the search criteria, and another that displays the percentage and/or number of the matching contacts that are massageable. Some contacts may not be massageable because they have been contacted recently in other campaigns or for other reasons that may be implemented with messaging and/or metering rules as described below.

The user then moves a slider bar left or right to select the number of matching and massageable contacts to send messages to in this campaign. The total number, in this case 72, appears in the box to the right of the slider bar and is continuously updated as the user moves the slider bar back and forth.

Figure 7:
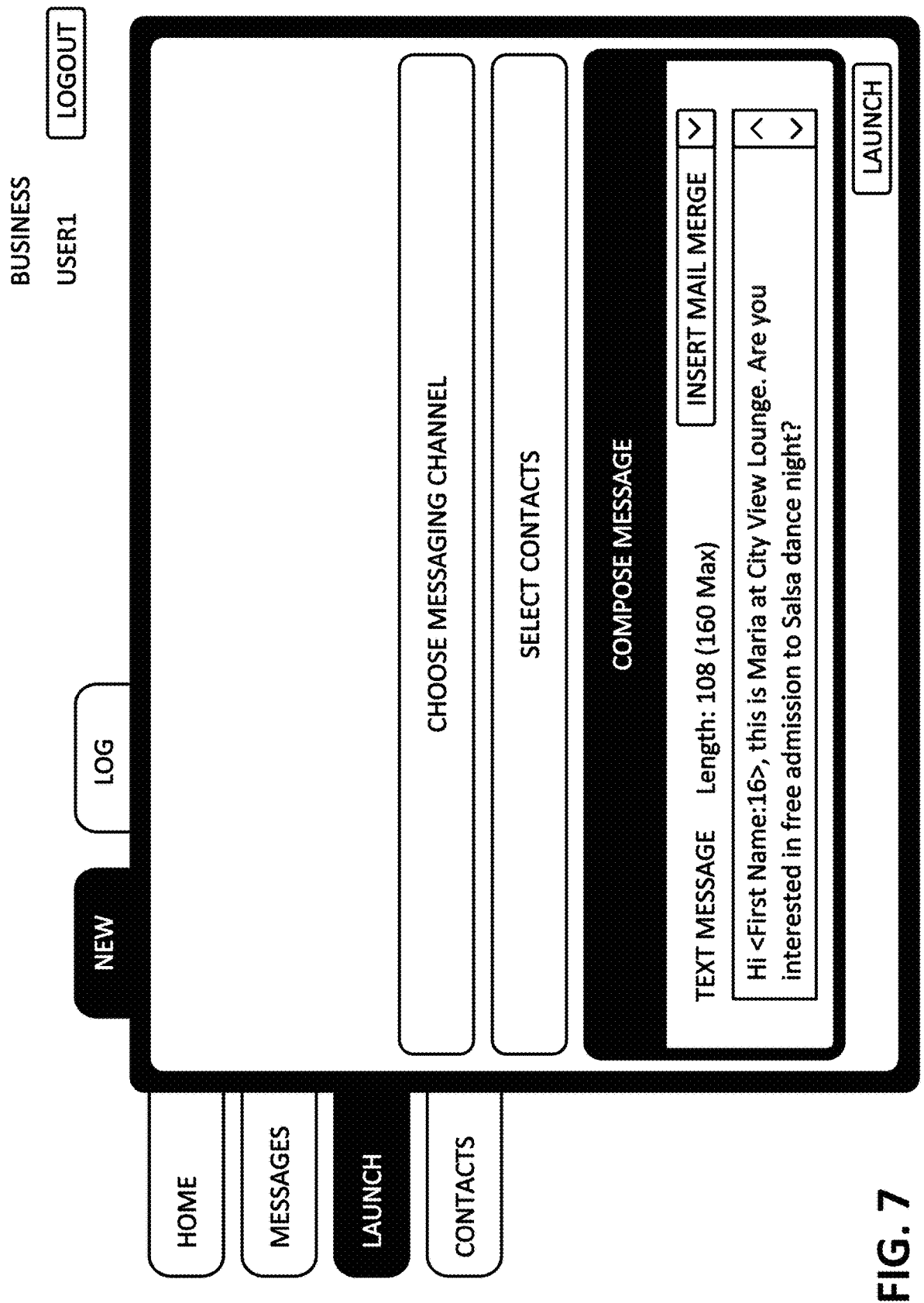
FIG. 7 illustrates a main launch menu and compose message dialog box according to the inventive principles of this patent disclosure.

After selecting the number of consumers to message in this campaign, the user proceeds to the COMPOSE MESSAGE dialog box as shown in FIG. 7. When selected, this dialog box expands and presents the user with a text box for composing a message which will be used as the first message each consumer receives in the campaign. The user may compose the message by typing text into the text box, but at appropriate points, the user may use the INSERT MAIL MERGE pull down menu to insert data from any of the fields in each contact record directly into the message. In this example, the recipient's first name is inserted after "Hi", and is shown in the text box as <First Name:16> which indicates that the system allocates 16 characters to the name when calculating the length of the message to make sure the message does not exceed the maximum message length.

The user then initiates the campaign by clicking the LAUNCH button at the bottom right of the main window. What happens next is largely invisible to most users in a typical implementation. The unified messaging engine begins transmitting the message to the selected recipients using various techniques for metering and modifying message delivery and content as described below.

Message Metering

As mentioned above, conventional marketing campaigns rely on frequently blasting large numbers of recipients with generic messages. This often causes consumers to ignore messages and unsubscribe or opt out of messaging channels or campaigns. A further problem is that, if a message blast does have a good initial response rate, it may be difficult for the sender to reply to the recipients with person-to-person follow up responses in a timely manner, thereby wasting valuable sales leads.

To avoid these problems, a unified messaging system according to the inventive principles of this patent disclosure may include metering features that limit the number, frequency, speed, etc. of messages that are sent to consumers. These metering features may typically be controlled by the operator of the unified messaging system and may not be accessible to a business user because the system operator may have extensive experience supervising messaging campaigns and may be in a better position to define suitable limits for campaigns. Alternatively, the metering features may be accessible to a higher level business user, for example regional manager of a restaurant chain, while lower level users are restricted to the simpler functions illustrated in FIGS. 5-7.

Figure 8:
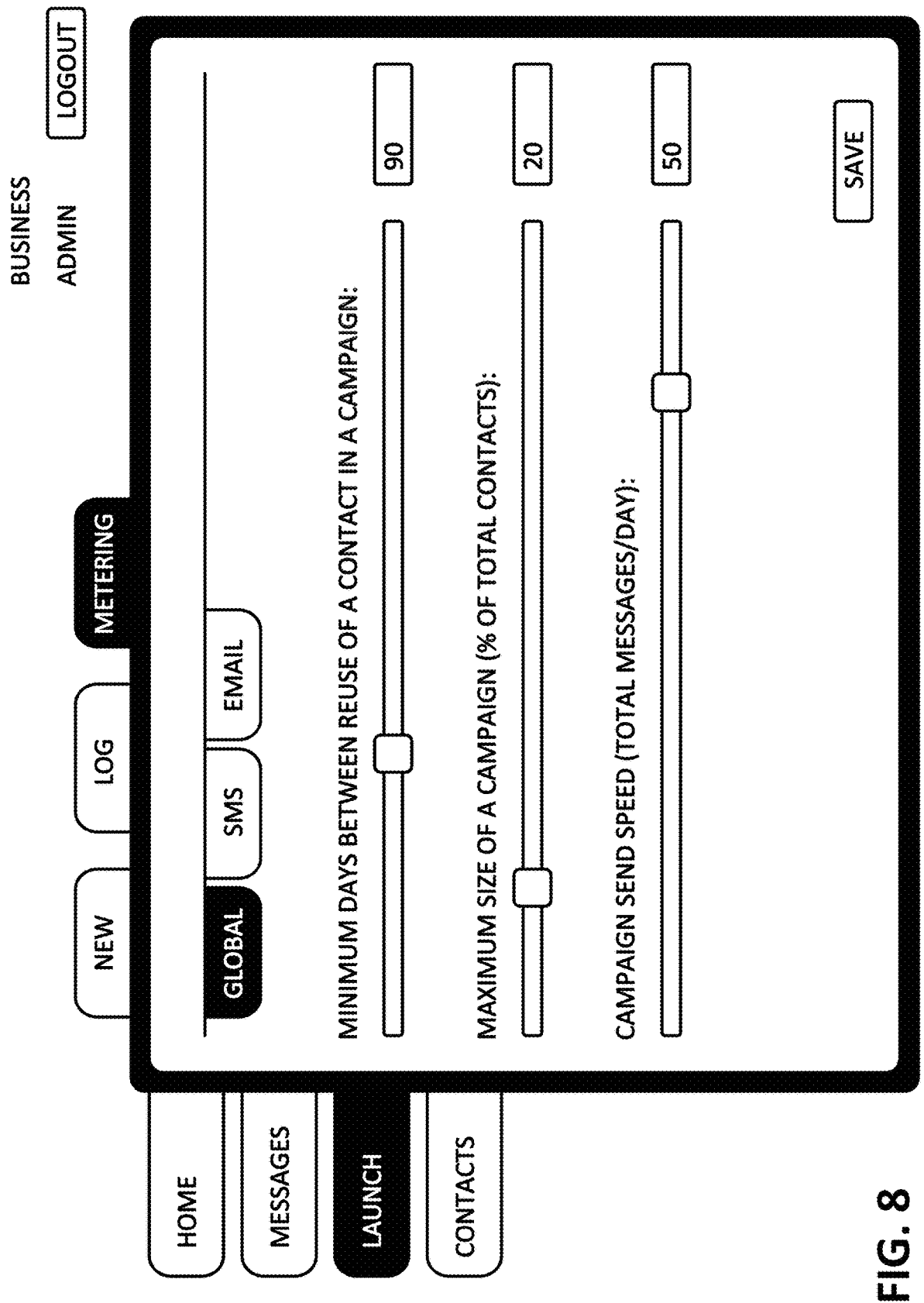
FIG. 8 illustrates a main launch menu according to the inventive principles of this patent disclosure.

FIG. 8 illustrates a screen for controlling message metering functions. The screen shown in FIG. 8 is accessed by clicking on the METERING tab which is only accessible to certain users through the LAUNCH main button. In this example, the user is logged in as an administrator which provides access to the metering settings.

The screen of FIG. 8 includes slider bars that enable the user to set the minimum number of days between reuse of a contact in a campaign, maximum size of a campaign as a percentage of total contacts, and campaign send speed, which may be defined in terms of messages per minute, hour, day, etc. The numerical values corresponding to the slider positions appear in boxes to the right of each bar. Sub-tabs at the top of the main window enable the user to specify whether the settings are to be applied to a specific channel such as SMS or email, or on a global basis. Once the user has the settings adjusted, they can be saved by clicking the SAVE button at the bottom right. The unified messaging engine then uses the metering settings for the specified channels in subsequent campaigns. Additional message metering techniques are described below.

Definable and Crowd Sourced Opt Out Rules

Another point of friction between businesses and the consumers they want to message is the need for effective opt out mechanisms. Conventional messaging systems typically require a recipient to take a specific action to opt out of receiving further messages from a sender. For example, the recipient may be required to respond to an unwanted or misdirected email by replaying to the email and including the word "unsubscribe" in the subject line or body of the email. In other systems, the recipient may be required to click on a link that automatically unsubscribes the recipient or requires the recipient to confirm the intention to unsubscribe at the URL in the link.

In a messaging system according to the inventive principles of this patent disclosure, a recipient's intention to opt out from further messages may be inferred from a broad range of rules as applied to the recipient's expressions. The system may maintain a list of rules as shown in FIG. 9 which illustrates an embodiment of a screen for managing opt out rules in a dynamic messaging service according to some inventive principles of this patent disclosure. Initially, a rule may be established for every phrase that a recipient may use to try to convey an intent to unsubscribe. As may be expected when confronted with an unwanted message, recipients may sometimes resort to colorful language to express their frustration as is apparent from some of the phrases illustrated in FIG. 9 where **** may indicate inappropriate language.

After establishing an initial list, further manual and/or automated additions, deletions, updates, etc., may be made to the list on an ongoing basis. The modifications to the list may be made in response to several different factors including coordination with complaint or opt out report mechanisms, algorithmic analysis, and identification of an opt out intention manually by the originator/recipient.

As with the message metering settings, op out rules may only be accessible to the operator of the unified messaging platform, or to higher level business users. The messaging platform operator may be especially well suited to implement opt out rules because the operator can use the collective experience gained from observing recipients' responses over a broad range of businesses that use the platform.

Cross Platform Messaging for Invitations and Incentives

Some of the inventive principles of this patent disclosure relate to systems that allow event organizers and marketers to invite specific attendees/participants to an event or deal and aggregate their responses in one place irrespective of what messaging platform they were reached on. The systems may enable marketers to control and track who shares the invitations and incentives. Those attending may be empowered to share the event/deal with their social network regardless of what social or media platform that sharing is conducted on. The system may enable opt in and/or RSVP that tracks all community actions around messages through a plurality of networks, both social and electronic.

An embodiment of a cross platform invitation and incentive system according to the inventive principles of this patent disclosure allows messages to reach beyond their initial channel by empowering each user at every step to have a broad range of multi channel sharing options lesser than, equal to, or greater than that of the original sender. The system may, among other things, reduce time, energy and/or friction involved in cross channel or person to person sharing and also provide analytics into how messages are traveling, growing, declining, and which users are the most influential. A specific application may include a module for multi channel event RSVP that functions as a marketing and sharing analytics tool.

A cross platform invitation and incentive system according to the inventive principles of this patent disclosure may be integrated with a unified messaging platform as described above to achieve synergistic results, and an example embodiment will be described in the context of a unified messaging platform using similar terminology, but the principles have independent utility and may be implemented in a separate system.

In an example embodiment of a cross platform invitation and incentive system, sharing links are used to facilitate the sharing, tracking and analytics described above. In this example, the sharing links are implemented with URL hyperlinks to web pages that are dedicated to specific promotions by specific users referred to as promoters. For example, an auto dealership may want to promote a series of special invitation only sales events. The dealership sales manager may use the system to create a specific Internet landing page for each salesperson for each event, e.g., a total of fifteen landing pages if there are five salespeople and three events, as shown in FIG. 10.

Assuming the dealership is a customer of a unified messaging platform as described above, and each salesperson (promoter) has a user account on the messaging platform, each promoter may use the messaging platform to send messages that include the sharing links to prospective attendees for the sales events. For example, referring to FIG. 7, the COMPOSE MESSAGE dialog box may be modified to include another pull down menu that enables the promoter to insert the URL for a specific event into the body of a text message. Thus, the message may read as follows:

"Hi<First name:16>, this is Travis at County Auto. You're invited to a private sale on Friday. Accept and share with friends here: <URL>."

When a recipient of the text message clicks on the link, it opens a browser and loads the event/promoter specific landing page. At the landing page, the recipient may then be allowed or required to enter some form of contact information to allow the system to confirm the recipient has a valid contact method. The recipient may also be prompted to specify a number of additional guests the recipient would like to bring. Further confirmation of the message may be required to authenticate this process. An example landing page is illustrated in FIG. 11.

Figure 12:
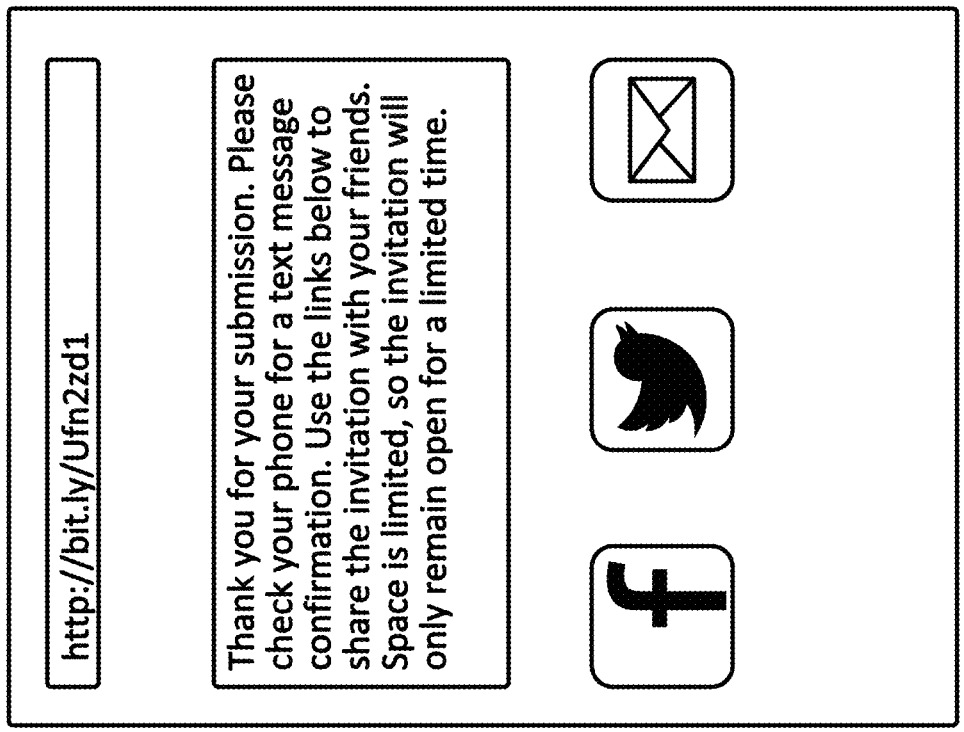
FIG. 12 illustrates an example confirmation and sharing page for a cross channel promotion according to some inventive principles of this patent disclosure.

After entering the required information, the recipient may be presented with a confirmation message through the browser and encouraged to share the promotion through various channels such as Facebook, Twitter, email, etc., as shown in FIG. 12. The original recipient may also receive a confirmation text message after signing up for the event. The promoter may pre-populate sharing messages with wording asking the new recipients to join the original recipient, and including the same event/promoter specific sharing link so that the new recipients can sign up for the event in a manner that is traceable to the promoter. For example, if the original recipient clicks on the Twitter button on the landing page and designates a Twitter user, that Twitter user is sent the following message through Twitter:

"I just signed up for a private sale at County Auto! Join me<URL>."

Figure 11:
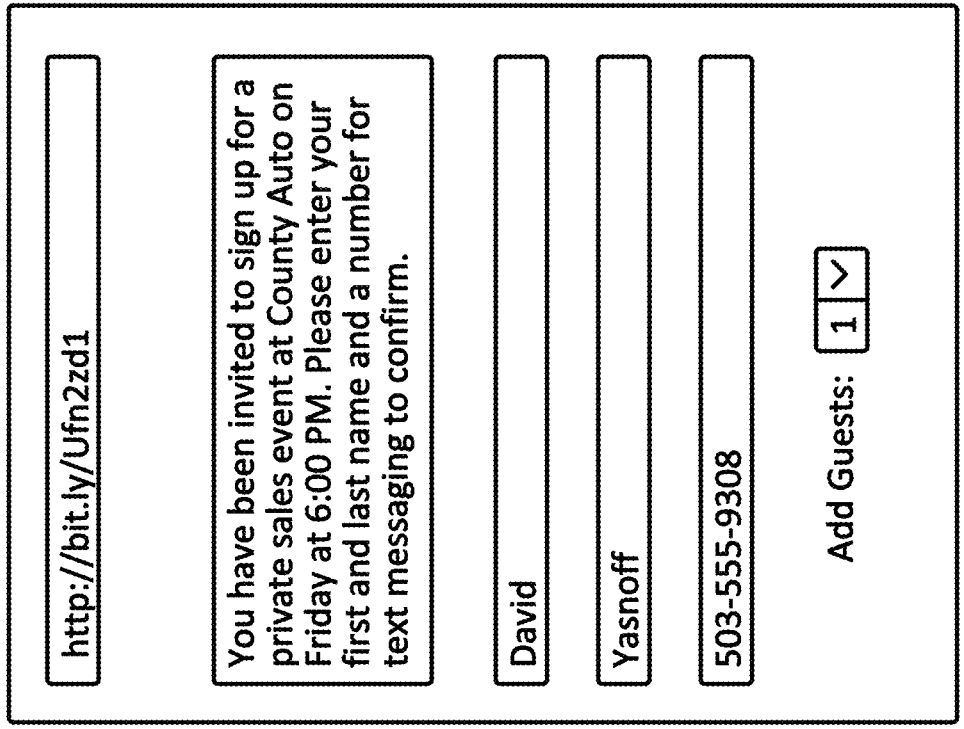
FIG. 11 illustrates an example landing page for a cross channel promotion according to some inventive principles of this patent disclosure.

If the Twitter user then clicks the link, the Twitter user is taken to the same landing page shown in FIG. 11 and the Twitter user can sign up for the event and share it again with others.

FIG. 13 illustrates an embodiment of a screen for pre-populating landing page messages and sharing messages according to the inventive principles of this patent disclosure. The Event Description appears first on the landing page as shown in FIG. 11, and the Web Confirmation Message appears next as shown in FIG. 12. The SMS Confirmation Message (including the URL for the sharing link) may be sent to the original recipient after entering the required information at the first screen of the landing page. The Twitter Share Message, Email Share Message and Facebook Share Messages may be sent through their respective channels to additional recipients designated by the original recipient at the second screen of the landing page.

The use of sharing links makes it easy for the system to keep track of how many message recipients have opted in to promotions for each promoter as shown in FIG. 14. Each entry in FIG. 14 lists the name of the recipient that signed up for the promotion, the name of the promoter that sent the message to the recipient, and in the case of a promotion that encourages physical attendance, the number of guests that actually attended and the number of guests that were specified on the landing page of the sharing link. Before the event, the screen of FIG. 14 may provide a list of expected attendees. At the event, the screen may be used to confirm guests as they arrive.

The system may also provide analytics into which promoters, employees, partners, platforms, channels, etc., contributed to the attendance and/or opt in for the event as shown in FIG. 15. It may also differentiate between those people/methods that were directly responsible and those who simply accessed another person or network that generated the results.

In the example described above, individual sharing links for each promoter and event where generated by the system at the request of the sales manager, but in other examples, the links may be generated manually. Links may also be generated only for each promoter to be used across all events or promotions, or they may be created on an event wide basis by all promoters. The links may be supplemented with network names like Facebook, Email, Twitter, Push etc. Links may also be channel specific to track performance across messaging platforms.

In the example described above, the sharing links are implemented as URL hyperlinks to web pages, but in other embodiments, any other linking mechanism may be utilized including linking mechanisms built into various messaging platforms, messaging and sharing features built into mobile applications, even phone menu trees may be used as links because they enable recipients to select actions and enter information using the touch tone pad.

Aggregated Display for Multi-Channel Communication

Some of the inventive principles of this patent disclosure relate to providing an aggregated display for viewing and managing threaded multi-channel communication. A communications device and/or system accepts incoming and sends outgoing communications via multiple channels, e.g., email, text messaging, etc. The device or system aggregates incoming and outgoing messages into one display that threads the messages in chronological order from top to bottom and scrolling in real time, irrespective of the platform the messages are sent or received on. In some embodiments, conversation bubbles may be used to display these messages in an interleaved manner. The conversations bubbles may be color coded or otherwise visually differentiated to indicate the platform the message is occurring on.

Figure 16:
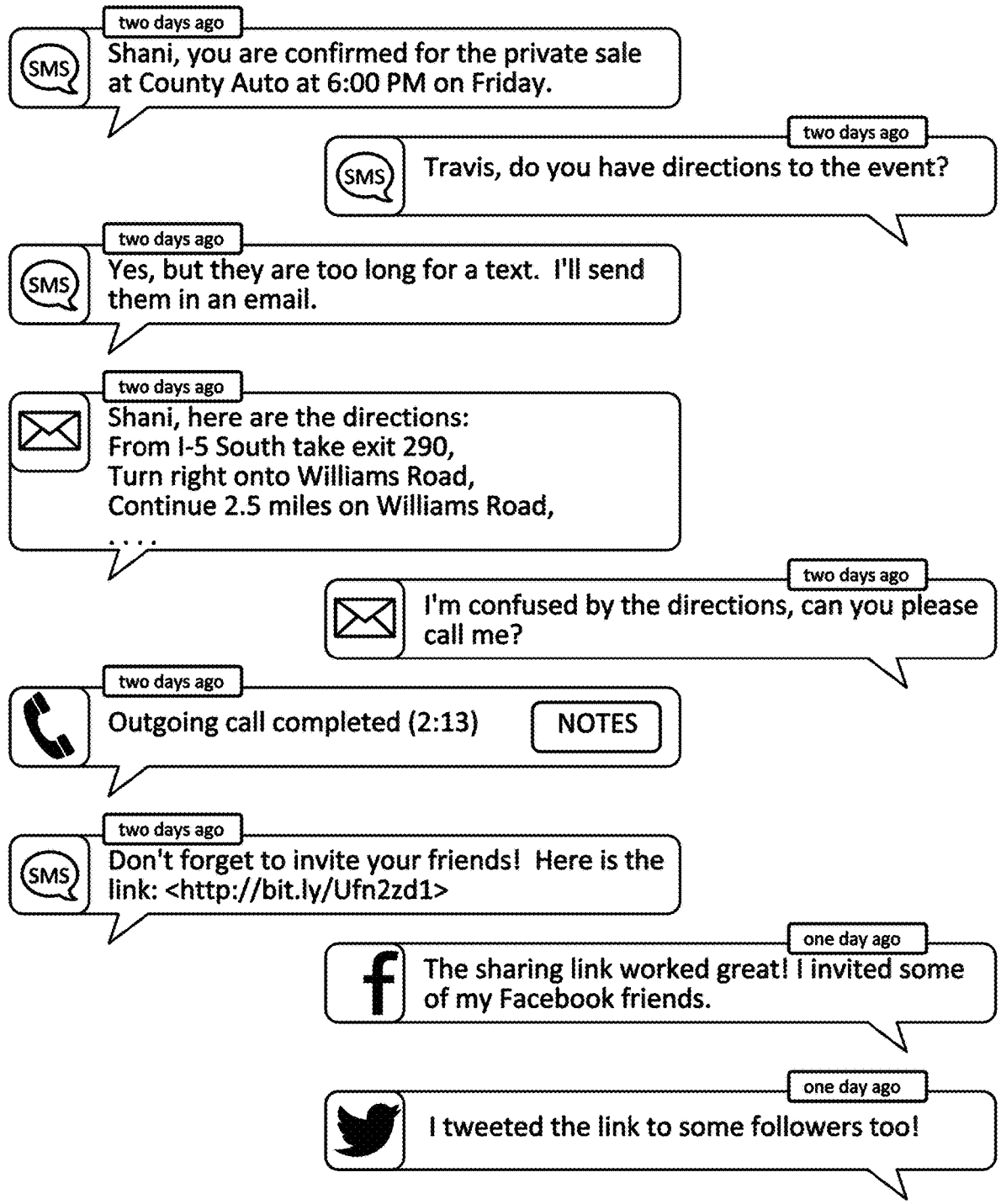
FIG. 16 illustrates an embodiment of a multi channel conversation display according to the inventive principles of this patent disclosure.

For example, referring to FIG. 16, the conversation bubbles on the left side of the screen contain messages from one user, and the bubbles on the right contain messages from another user. In this example, each bubble includes an icon that indicates the channel through which the message was sent or received, e.g., text balloons for text messages, an envelope icon for email, an "f" icon for Facebook, a bird icon for Twitter, and a phone icon for telephone call records. In the bubbles for telephone calls, a user may click the NOTES button to open a dialog box that displays any call notes the participant may have made taken about the call.

The inventive principles allow a user to get a complete view of all of the user's incoming and outgoing communications with each counterparty, irrespective of whether the messages from either party use the same system and regardless of platform the messages originate from. This can reduce or eliminate the need to log into a wide variety of platforms to access incoming and outgoing communications, reduce message response time, and provide a clearer picture of the relationship between users.

The inventive principles for aggregated displays may also be used to implement an aggregated display of streams and/or messages from multiple sources of newsfeeds, messages, sharing, etc. For example, a multi source social stream may include items from a user's Facebook newsfeed and/or postings interleaved in chronological order with tweets sent and/or received from the user's Twitter account. In some embodiments, the social stream may also include messages send and received through these and other social channels. The aggregated display stream may be implemented with balloons that may be positioned on the screen to indicate the conversation participant they are associated with. In some embodiments, clicking on one of the display stream items may open a window to a full user interface for the channel associated with the item. Alternatively, clicking on an item may open a compact comment drafting tool to respond to the item.

Modified Message Delivery

Some of the inventive principles of this patent disclosure relate to techniques in which the operation of a messaging system is modified dynamically in response to ongoing assessments of various factors such as the behavior of the sender, the sources of the sender's contact data, and actions taken by the recipients in response to the messages. The inventive principles relating to modified message delivery may be used in conjunction with a unified messaging channel such as that described above with respect to FIGS. 1 and 2, for example they may be implemented with logic in the unified messaging engine, but the principles relating to modified message delivery have independent utility.

Figure 17:
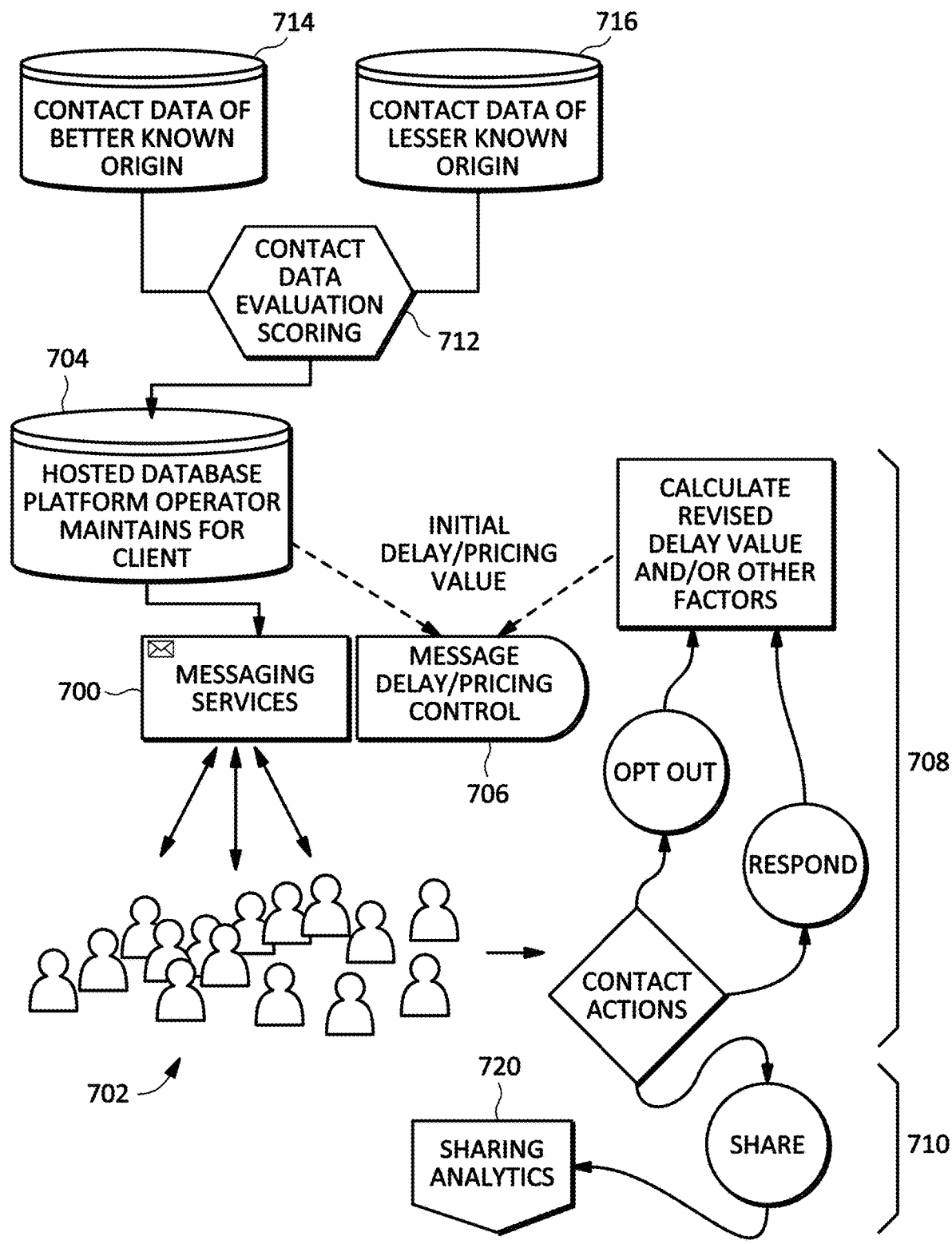
FIG. 17 illustrates an embodiment of a system for providing modified message delivery according to the inventive principles of this patent disclosure.

Referring to FIG. 17, the system includes a messaging services module 700 that sends messages to recipients 702 based on source data in a database 704. A message control module 106 provides supervisory/control functionality to the messaging services module 700. A modification module 708 includes logic that revises the manner in which messages are sent based on actions taken by recipients as a result of the messages, thus forming a real-time feedback loop. A sharing module 710 includes logic that provides sharing analytics in response to actions taken by recipients as a result of the messages.

The contact data stored in database 704 may be obtained from any suitable source, but in this embodiment, it is provided by a scoring module 712 which selects the most suitable contact data from one or more databases such as a database 714 having contact data of better known origin and a database 716 having contact data of lesser known origin.

Any module described through this patent disclosure may be implemented with any combination of hardware, software, firmware, etc., or any combination thereof. For example, the messaging services module 700, message control module 706, modification module 708, and sharing module 710 may be implemented on individual servers, or they may be implemented as separated software modules on a single server. The message control module 706 may be separate from, or integral with, the messaging services module 700.

In this example, the database 704, and modules 700, 706, 708, 710 and 712 run on hardware that is owned or otherwise controlled by the messaging service provider (MSP), or in the case of an implementation with a unified messaging platform by the platform operator, but various components may be owned or controlled by other entities. Different embodiments may include fewer than all modules and/or multiples of various modules. In some embodiments, the messaging services module 700 may essentially be a pre-existing or off-the-shelf messaging system with the remaining modules implemented as add-on components.

The system may apply trust logic to each unique client (business user or sender) and that client's data, as well as the client's behavior and/or any other factors, to control and/or modify the operation of the messaging system. The trust logic may be implemented at any suitable point in the system, for example, in message control module 706 in combination with the scoring module 712.

Examples of the manner in which the operation of the messaging system may be modified include (1) changing how, when and if messages are delivered, for example, by delaying or canceling delivery of messages or changing the number of messages delivered; (2) changing the price that the MSP charges for messages or charges as penalties; and (3) changing the sender's reputation score in the sharing module 710.

The sender's overall message costs, delivery speed or other factors may be affected by any or all of the factors considered in the ongoing assessments. For example, in some embodiments, opt outs may be assigned a cost which the sender may be required to pay in the form of reduced message delivery speed or increased per-message pricing. As another example, in some embodiments, the sender may be required to make an apology payment to a recipient that has received a misdirected/unwelcomed message after opting out. Additionally, or alternatively, the sender may be assigned a cost in the form of a reduction in the sender's reputation score and other sender information in a database in the sharing module 110 as described below.

The opt out costs may be implemented in the modification module 708, which may also implement various other incentives, disincentives, rewards and/or punishments for different behaviors and/or message outcomes to encourage practices desired by the MSP. Examples include apology payments to offended customers, slowing down or speeding up message delivery rates, stopping messaging, increasing or decreasing messaging costs specific to that sender, and any other factors that may be used to encourage or discourage various behaviors by the sender.

The sharing module 710 includes sharing analytics logic 720 that calculates a reputation score for each sender based on the history of the sender's behavior, recipient actions (e.g., opt out rates), etc. In some embodiments, the sender's reputation score and other sender information may be made available to other message senders, possibly for a fee, to assist the industry in evaluating client reputation.

In addition to modifying message delivery factors such as message delay, pricing, etc., the content may be modified dynamically to provide improved or optimized content in future messages, or in dynamic content within or linked to the message. For example, if a sender delivers three different types of emails to three different groups of recipients, each type of email having different content, the type of email receiving the best click through or response rate may be sent to all future recipients. If the email types include dynamic content, e.g., links to HTML resources, the dynamic content may be updated or optimized based on the type of email receiving the best click through or response rate. With dynamic content, the content may be updated even for emails that have previously been delivered. Additional description of modified message content is provided below.

Modified Message Content

Some of the inventive principles of this patent disclosure relate to automated testing of messaging performance and post launch augmentation for optimized content display and outcomes. As with the principles related to modified message deliver, the inventive principles relating to modified message content may be used in conjunction with a unified messaging channel such as that described above with respect to FIGS. 1 and 2, for example they may be implemented with logic in the unified messaging engine, but the principles relating to modified message content have independent utility.

A system may create and deploy electronic messaging campaigns with variable messages that are then measured for various factors such as sharing, response rate, opt out rate, and open rate. The system may send messages individually and/or in batches using a delay system to measure the performance of the messages. As outcomes are determined, the system may change which messages are sent or viewed to optimize for the desired outcome. This effectively promotes some messages to be viewed exclusively or more often and downgrades or discards underperforming messages.

Messages not yet viewed, opened, or otherwise accessed by the end recipient may be altered to reflect the system's most updated information regarding which content is most likely to generate a favorable outcome at the time the message is accessed by the recipient. This type of dynamically modified message content may be implemented on electronic messaging platforms that send messages that contain or reference dynamic content.

In some embodiments, the system may aggregate tendencies and information about individual recipient responses and actions among multiple accounts and/or vendors to create a shared marketplace/database. It may also create built-in defaults that exclude recipients that have been recently messaged.

In some embodiments, the system and/or marketplace may track message content, response, engagement, sharing and other outcomes to analyze which content or method the recipient prefers or is likely to act on. It may also use those preferences to determine which contacts should receive a new message at what time and with what specific content. The system can algorithmically determine likely outcomes by establishing correlating factors such as education, address, or other factors on the effectiveness of certain messages or persuasion techniques. Also, by using any of these or other factors, the system may automatically determine the frequency at which a specific sender should send messages to optimize outcomes and minimize op outs.

Any of the information described above, along with preferences provided by a sender, may be held by the sender, crowd sourced, pooled, or bought, sold or shared among multiple messaging vendors and across multiple accounts to determine recipients' individual proclivities. Any of this information may be used for various purposes such as determining which recipients are likely to complain, opt out, or ignore messages irrespective of who the sender is, on what platform the messaging is sent, who is delivering the message, or the content of the message. Other uses include determining which recipients are the most likely to share messages at a higher rate than normal, thereby allowing senders to improve the average effectiveness of messages by targeting those users most likely to respond. User's tendencies to respond to or act on various forms of persuasion techniques may also be employed to optimize messaging.

Message Metering and Outcome Measurement

Some of the inventive principles of this patent disclosure relate to additional techniques for metering messages by periodically sending messages to different portions of a population. As with the principles related to modified message deliver and content, the inventive principles relating to message metering and outcome measurement may be used in conjunction with a unified messaging channel such as that described above with respect to FIGS. 1 and 2, for example they may be implemented with logic in the unified messaging engine, but the principles relating to modified message content have independent utility.

The population may be determined in any suitable manner, for example, by selecting a predefined group, by using a defined search based on customer data, etc. The portion of the population may be determined, for example, as a percentage of the population, as a fixed number of the population per iteration, etc. The periodic sending of messages may continue until messages are delivered to the entire population, until a specified amount of time or number of iterations have passed, or until a specific outcome has been achieved.

For example, a company may wish to message all of its female customers aged 25-30 who like the color red. While 9,000 customers may meet these criteria, the user may message only ten percent (900) of the customers one day, 900 of the customers the next day, etc., until messages are delivered to all 9,000 customers who meet the criteria. The ten percent of customers selected for each day may be selected at random, or using other search criteria. The search criteria for the population and subpopulations may be reused from previous searches and/or saved for future searches.

Metering of messages allows senders to deliver messages to subpopulations of customers or other recipients while avoiding message overload for any specific recipient or group of recipients.

Figure 18:
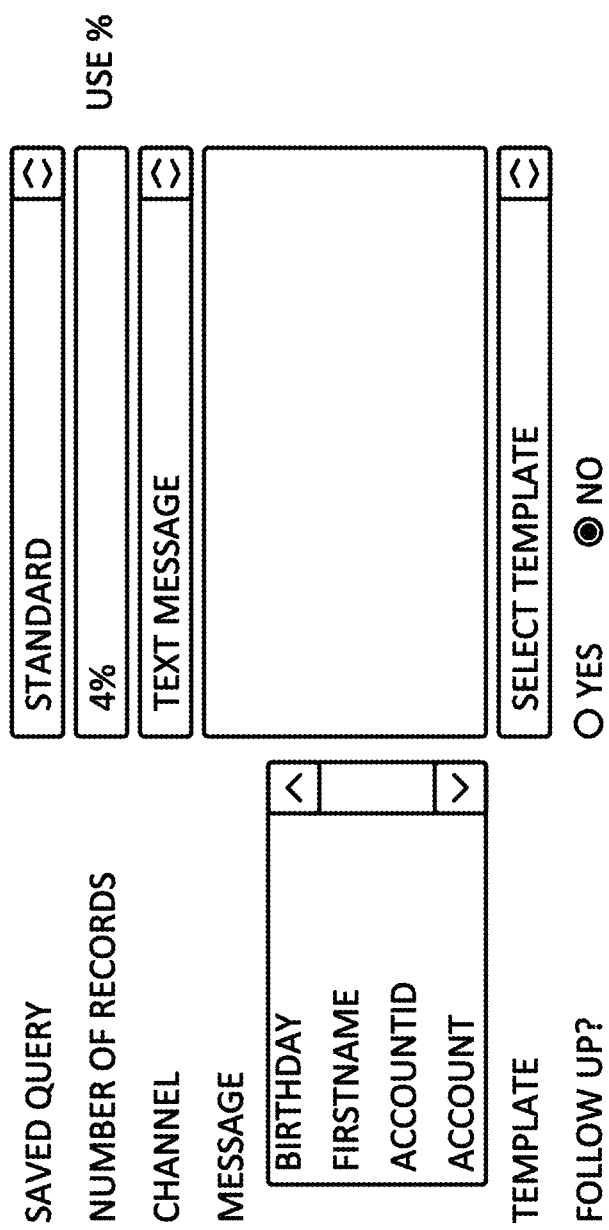
FIG. 18 illustrates an embodiment of a screen for setting up a metered messaging campaign according to the inventive principles of this patent disclosure.

FIG. 18 illustrates an embodiment of a screen for setting up a metered messaging campaign according to the inventive principles of this patent disclosure. The Saved Query field at the top enables the sender to select a saved query. The Number of Records field enables the sender to select a percentage of the search results to deliver a message to during each iteration. The Channel field enables the sender to select the channel for the message such as email, SMS, etc. The Message field enables the sender to compose the message to be delivered which may include a body, recipient's name, account ID, etc. The Template field enables the sender to select from predefined templates for the message, and the Follow Up selector enables the sender to specify whether there should be a follow up.

In some embodiments, a sender may select a specific outcome such as making a certain number of dinner reservations or selling a predetermined number of tickets. The system may continue sending messages periodically to different portions of a population until the specific outcome is achieved, regardless of the number of iterations (within specified limits). This type of outcome measurement enables the duration of the messaging campaign to be adjusted dynamically to achieve the desired result, rather than having to estimate the result in advance and guess the number of iterations, percentage of recipients per iteration, etc.

Defining and Sharing Messaging Preferences

Some of the inventive principles of this patent disclosure relate to defining and/or sharing one or more recipients' preferences for message delivery and sorting.

In an embodiment of a system according to the inventive principles, users receive messages via various electronic media and may choose to sort/handle these messages in various ways including blocking, delivering immediately, delaying/scheduling delivery, skipping the inbox and delivering directly to a message achieve, or holding in a queue to be reviewed when/if the end user wishes to.

Figure 19:
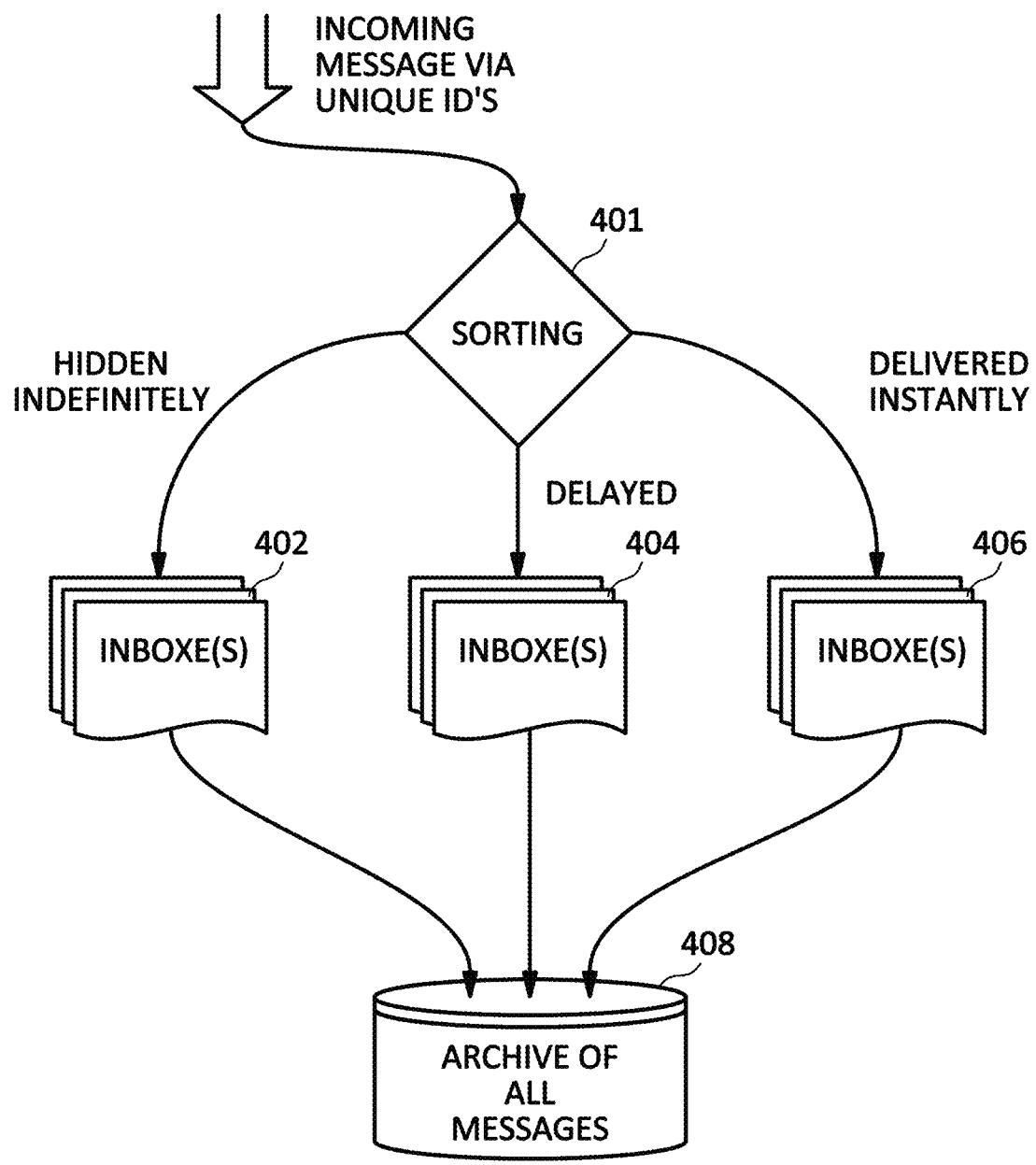
FIG. 19 illustrates an example embodiment of a method for defining and/or sharing one or more recipients' preferences for message delivery and sorting according to the inventive principles of this patent disclosure.
Figure 20:
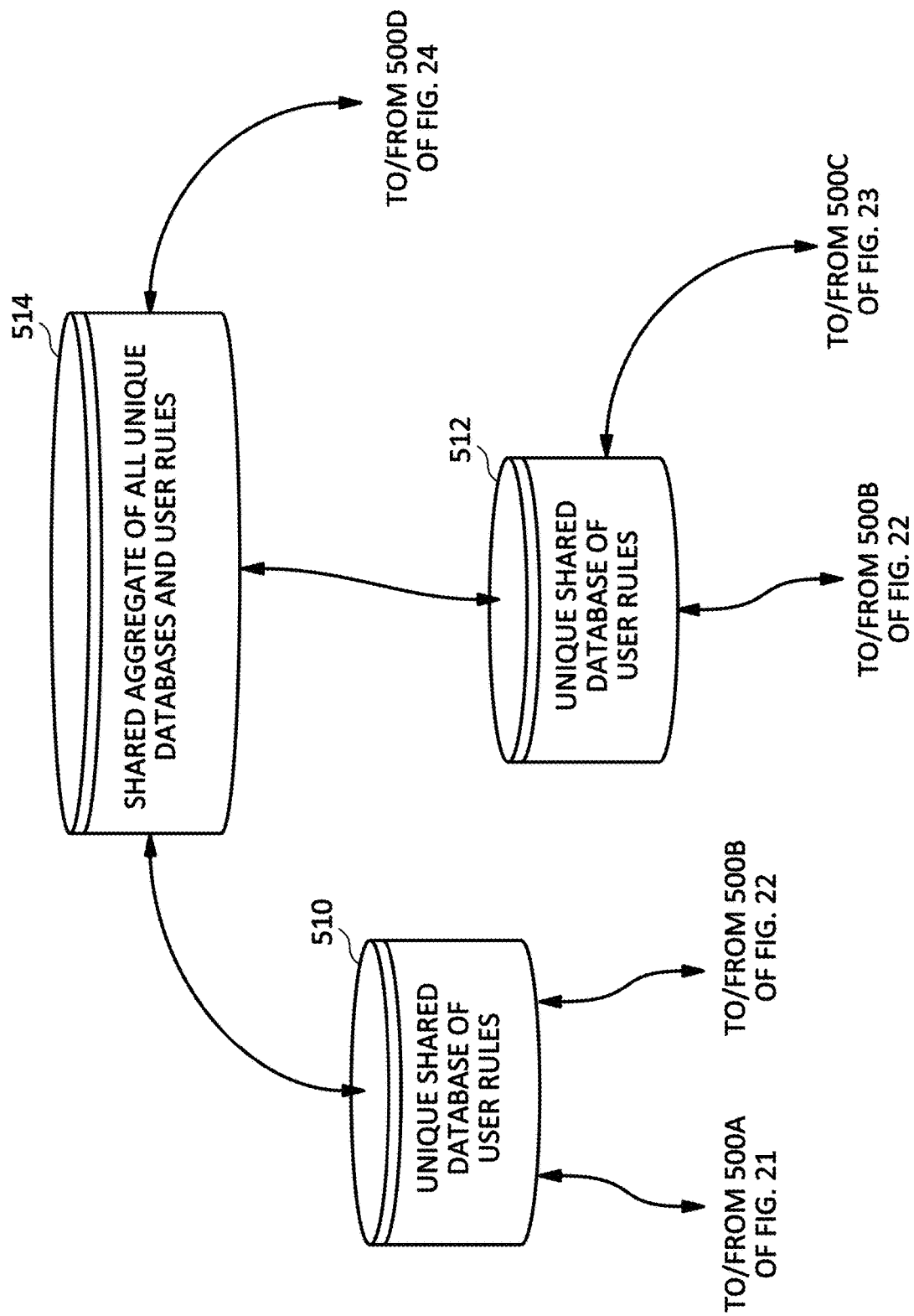
FIGS. 20-24 illustrate an example embodiment of a method for linking together rules sets created by multiple users for aggregation and sharing according to the inventive principles of this patent disclosure.
Figure 21:
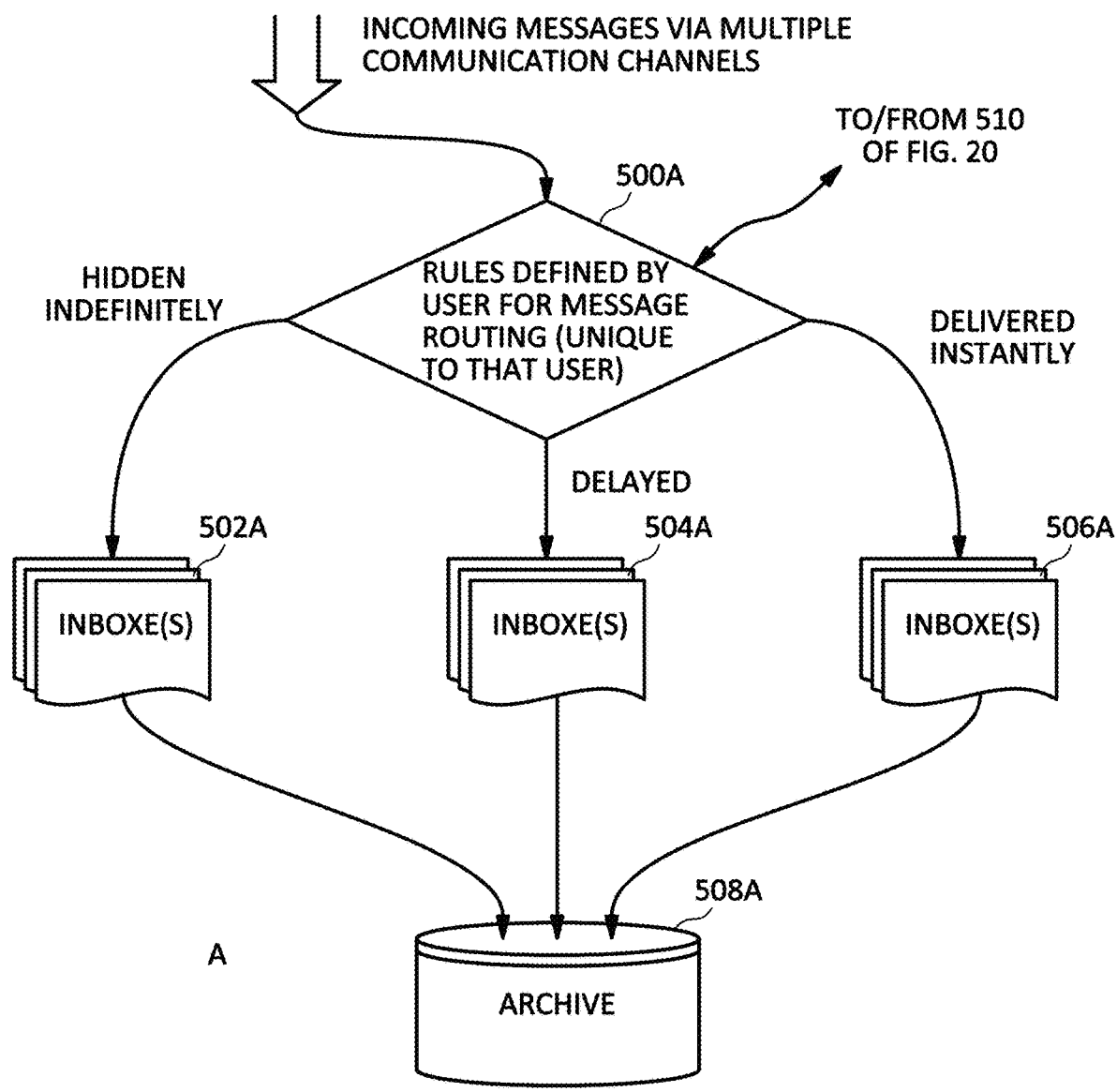
Figure 22:
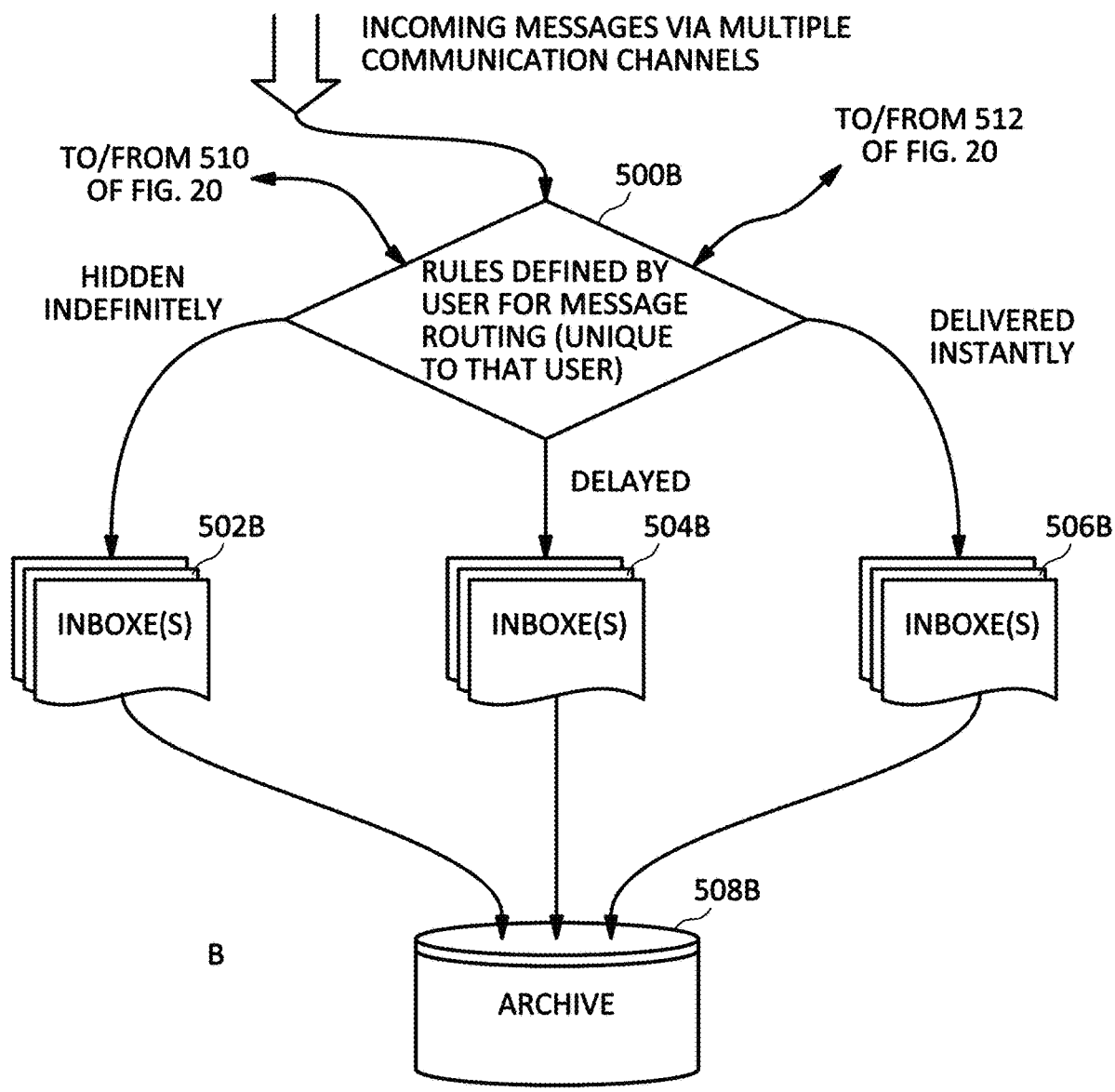
Figure 23:
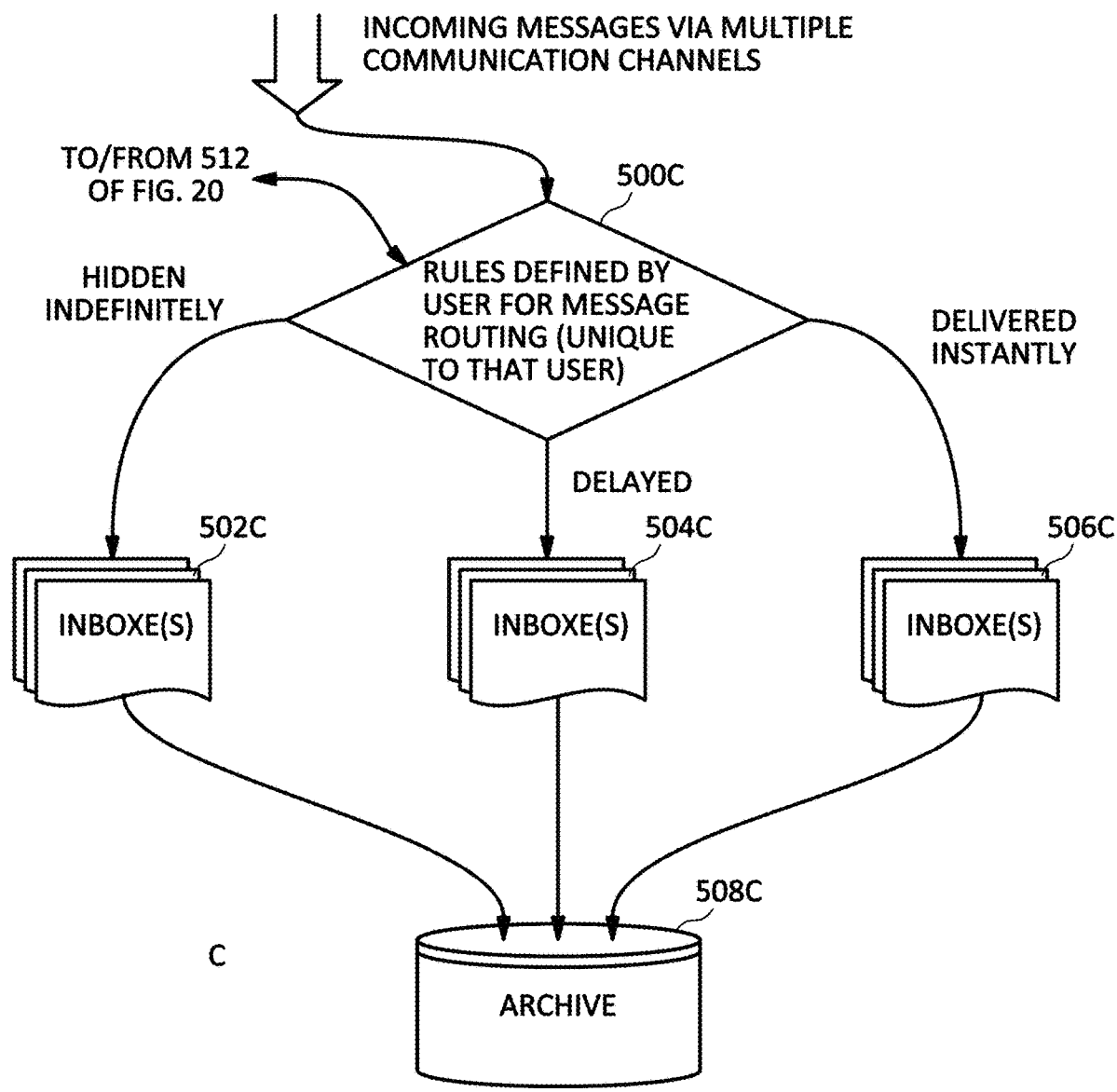
Figure 24:
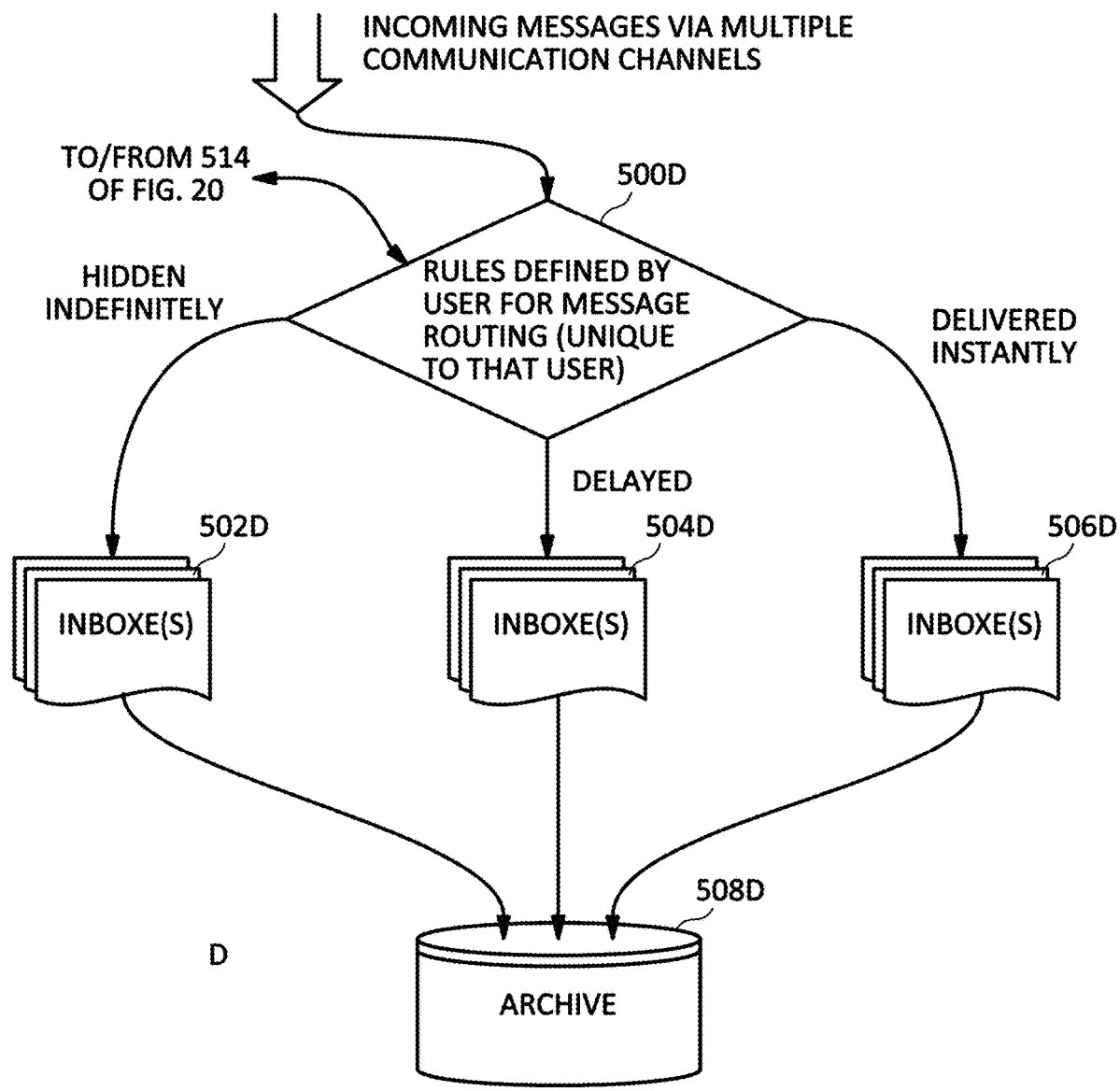

One example of a user-defined delivery and sorting preference is illustrated in FIG. 19. Incoming messages are processed by sorting module 401 which may sort based on factors such as sender ID, time, frequency, mode the receiver is in, format, content, and relationship to recipient or recipient's network. In this example, the sorting logic 401 may cause the messages to be hidden indefinitely, delayed or delivered instantly. Separate inboxes 402, 404 and 406 are included for messages that are hidden, delayed and delivered, respectively. All of the messages are eventually moved to an archive 408. This is just one possible configuration, and many other arrangements may be implemented according to the inventive principles.

Some or all of the sorting/delivery rules created by a user may be shared publicly, privately or some combination of the two. Each rule set may have an ID that may be linked to a profile. An example of this function is that if a user knows a trusted colleague who created a rule set for filtering certain email, SMS, and social traffic, the user may choose to adopt that rule set for the user's own messages. The user may make changes to that rule set, and the modified rule set may be shared/used by others. The user may choose to employ groups of rules or means/medians/modes or other combinations of rules in aggregate. The user may employ some/all of these rules as the default action unless the user has a rule that contradicts a rule defined or determined by other user(s).

The rule sets created by multiple users may be linked together for aggregation and sharing as illustrated in FIGS. 20-24 so that users can share sorting rules. The example of FIGS. 20-24 includes four user-defined rule sets A, B, C and D centered around sorting logic 500A, 500B, 500C and 500D. For ease of illustration, each of the rule sets are shown as being like that in FIG. 19, but in an actual implementation, the rule sets are likely to be different to reflect the differences in the preferences of different users. Database 510 is a shared database for rule sets A and B, database 512 is a shared database for rule sets B and C, and database 514 is a shared aggregate database of all unique databases for rule sets A, B, C and D.

Message recipients on any/all networks they are associated with may wish to collaborate on how to sort incoming communication. Using the principles described above, users may aggregate their rules to share their delivery and sorting preferences based on various factors regarding the message and the sender. The user could wholly adopt the entire community's rules, use them in part, or use them in some cases but have those rules superseded when their own rules conflict with the group sorting functions. Users may choose to include information as to why a rule was created or notes regarding the reputation of the sender. That information may optionally be added to profiles that may be viewed by the community. This allows for the community to assign reputation to those initiating communication either associated with or irrespective of the network that communication was initiated on.

Phone/Email Reputation Systems

Some of the inventive principles of this patent disclosure relate to phone and/or user ID based reputation systems. The inventive principles enable an organization or an individual receiving an incoming phone call, email, text message or other electronic communication to determine the reputation of the person/entity originating the call or message. Likewise, the person originating the call or message can also determine the reputation of the recipient they are reaching out to. Each user may maintain a profile connected to the user's contact information. Users may conduct various actions relating to their profiles including connecting, rating and commenting. The contact information used in the profile may be updated by the user, the community or some combination of the two.

This information may also be used to determine and display to a user the reputation or social connections/profile of another when the second user initiates a contact with the first via any communication platform. Thus, the receiving user can determine in real time the social connections/reputation of the first user who may be originating the communication/connection.

Uses include limiting fraud, friction and dissatisfaction related to transactions on and offline and boosting trust among strangers. An example is building trust between parties to transactions such as those facilitated by Craigslist and other resources that facilitate transactions between strangers. Since the parties' phone numbers may be tied to a reputation marketplace/community, each party would be able to see the other party's shared connections (mutual friends) across all social networks, shared phone/address book connections and the ratings of the parties by their connections and others. The reputations of those doing the rating may be individually determined or aggregated.

Automatic Contact Information Exchange

Some of the inventive principles of this patent disclosure relate to phone number replacement with updatable dynamic digital addresses. Users periodically need to update their contact information with the people in their networks. Rather than conveying the new information and making the counterparty update the information manually, the user may ask for and be granted permission to edit the information themselves. This permission may be provided globally, individually or in any other suitable manner so it is always updated in real time with no specific requests or human communication necessary in each update instance. Each user is provided or generates a unique link or key that allows the user to grant others access/edit/update permission for the other's contact record in the user's electronic address books. Users may ask for and receive this same permission from others in their network. A unique identifier may be provided as a permanent link to the content of the current contact information. Various levels of permission may be provided based on each users preferences, or shared rules for preferences.

Dynamic SMS Shared Short Code Routing

Some of the inventive principles of this patent disclosure relate to using dynamic SMS shared short code routing for empowering two way conversations with "sticky sessions."

Current short code SMS numbers (such as say 121212) may be shared among many different businesses. A customer may text a key word like "Soccer" to that short code to opt into messages from the customer's soccer league. Existing short code routing simply looks for keywords, it cannot understand or properly route conversational input. So if a user texts "Pepsi" to 212121, current systems will add the user's phone number to the messaging database for the "Pepsi" account and continue waiting for the user to text new short codes to the number to opt into other accounts.

The inventive principles provide a novel approach to shared SMS short code routing. After a user texts a keyword to a short code to opt in to messages from a client, all communication from the user to that short code is directed to the client that specified the keyword. This is accomplished by logic that assumes, for example, that once the user has texted "Pepsi" to 212121, all subsequent incoming messages to the 212121 short code are intended to reach the Pepsi account inbox. This means that if the user texts "Ford" to 212121, instead of opting into the "Ford" account, Pepsi will get a message from the user saying "Ford". In this configuration, the end user's ability to opt into multiple accounts shared by one short code number is restricted in favor of allowing two way communication.

To optimize for both maximum sharing and two way communication, the system may employ multiple short codes. In this case, if the end user texts "Pepsi" to 212121 the user would immediately receive a reply acknowledging the user's opt in from another number such as 313131 or 212.555.1212. All further incoming communications to 313131 from that user would be directed to "Pepsi," thereby creating a "sticky session."

However, further communication with 212121 such as "Ford" would be treated as an attempt to opt into a new account. By directing opt ins and two way conversation to different numbers, the message service can maximize the value of expensive or unique numbers and direct post opt in two way traffic to lower value numbers and or channels. This allows for two way conversation between the original sender and the end recipient without dedicated short codes. This configuration is not possible in a traditional configuration because the routing system only looks for keywords, and does not actively differentiate incoming messages based on whether that user has opted in previously.

Figure 25:
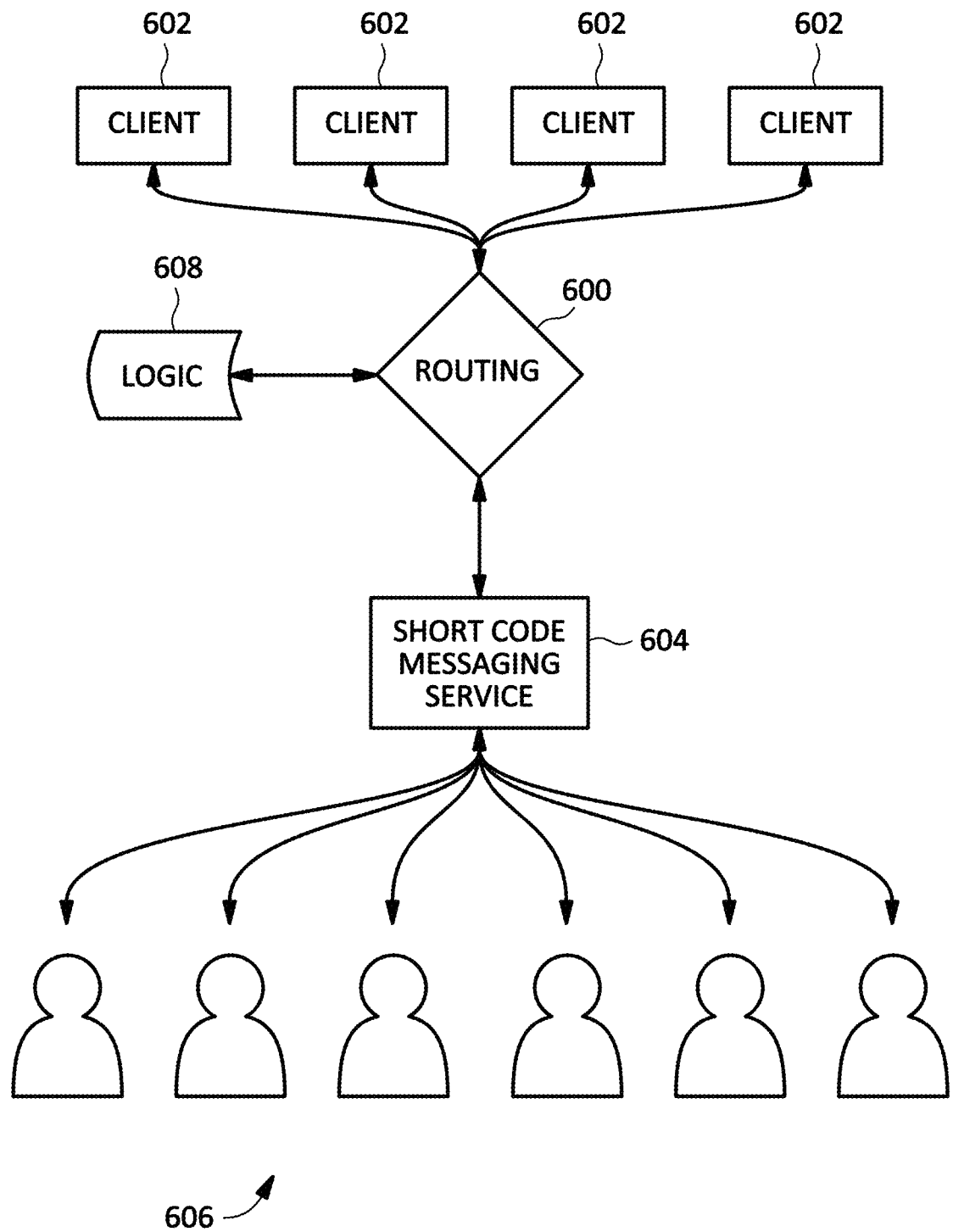
FIG. 25 illustrates an embodiment of a system for implementing dynamic SMS shared short code routing according to the inventive principles of this patent disclosure.

FIG. 25 illustrates an embodiment of a system for implementing dynamic SMS shared short code routing according to the inventive principles of this patent disclosure. Routing logic 600 routes messages between various clients 602 and a short code messaging service 604, which handles SMS traffic to and from users 606. Sticky session logic 608 modifies the operation of the routing logic 600 to redirect messages as described above and create sticky sessions. The logic and messaging services shown in FIG. 6 may be implemented with any suitable combination of hardware and/or software. In some embodiments, the sticky session logic may be implemented as a software module that is added on to otherwise conventional routing logic module 600.

Message Intervention and Integration with Legacy CRM Systems

Some additional inventive principles of this patent disclosure relate to methods and apparatus for operating a messaging platform in conjunction with customer relationship management (CRM) systems, especially legacy CRM systems. The example embodiments described below will be explained in the context of auto dealerships, but the inventive principles are not limited to auto dealerships.

Figure 26:
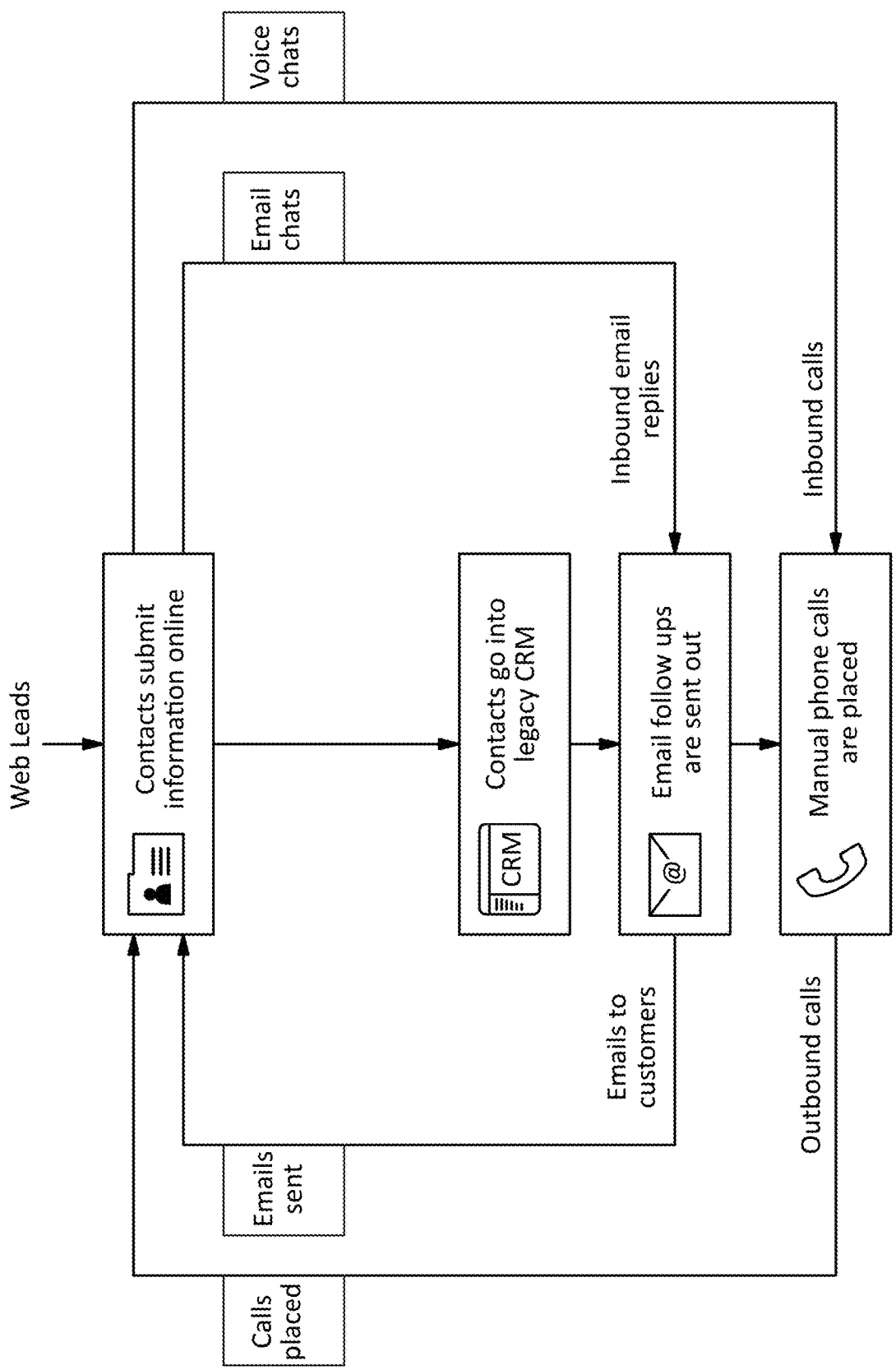
FIG. 26 illustrates a prior art system for qualification and following up on sales leads using a legacy CRM system.

FIG. 26 illustrates a prior art system for qualification and following up on sales leads using a legacy CRM system. A problem with prior art systems is that they typically allow most conversations between sales prospects (potential customers) and sales representatives (sales reps) to occur outside of the CRM system, so the sales rep needs to manually take notes on those conversations in the CRM system.

Another problem is that the system relies on manual follow-up from a sales rep which typically causes a delay that may dramatically reduce the likelihood of a completed sales transaction. This is especially problematic when sales leads are generated through a web-based source such as Kelly Blue Book (KBB), TRUECar, etc., where users tend to expect nearly instantaneous responses. There are prior art systems that automatically generate "canned" (standardized) responses, but research shows that consumers are much less likely to engage with standardized responses than responses that appear to come from humans.

Figure 27:
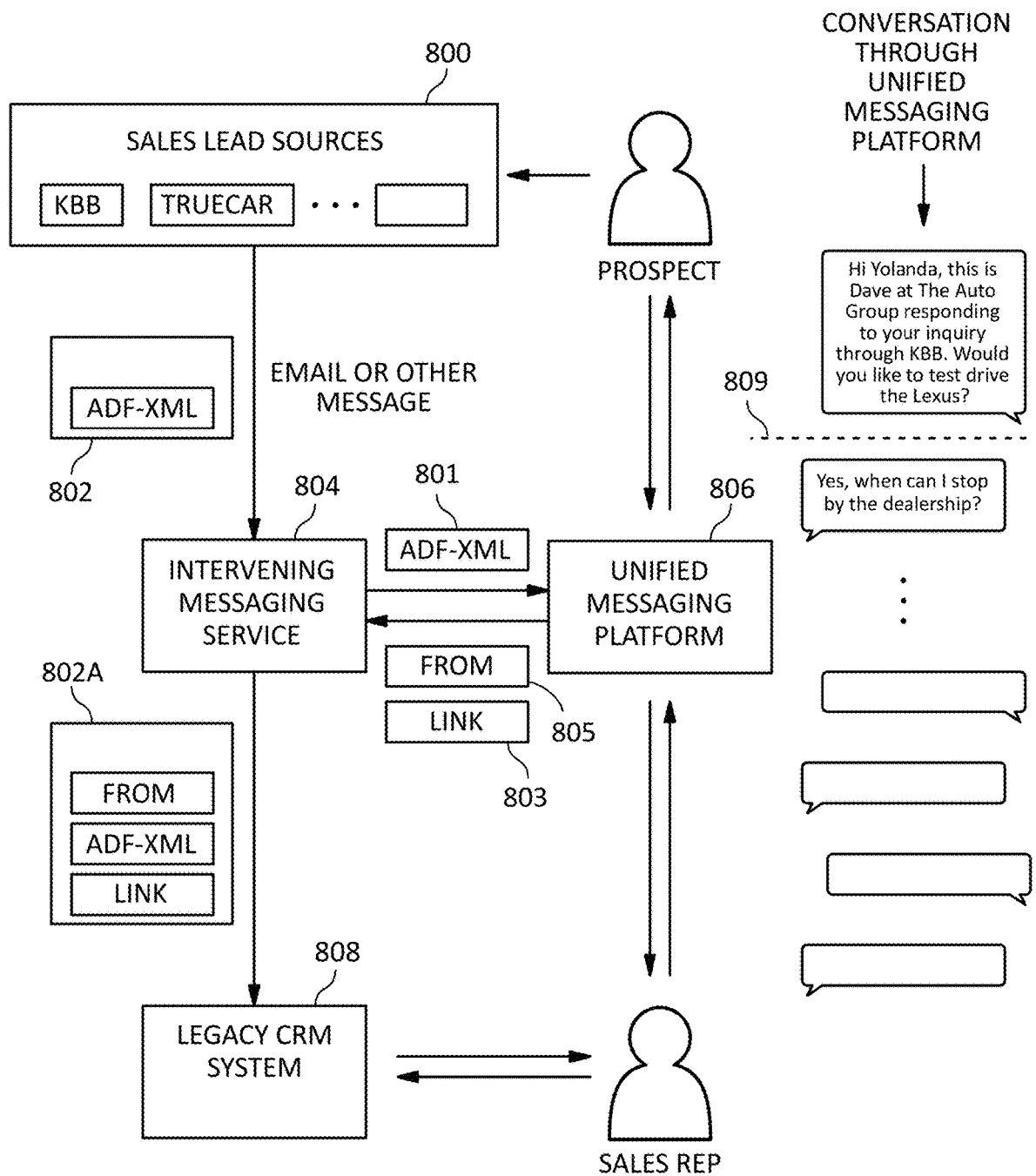
FIG. 27 illustrates an embodiment of a system for integrating a messaging platform into a legacy CRM system according to some inventive principles of this patent disclosure.

FIG. 27 illustrates an embodiment of a system for integrating a messaging platform into a legacy CRM system according to some inventive principles of this patent disclosure. In the system of FIG. 27, sales leads are generated from any suitable source of sales leads 800 such as KBB, TRUECar, etc., when a sales prospect enters their contact information and possibly information about a vehicle they may be interested in into the source 800. In this example, the information is immediately conveyed to a dealership using the Auto-lead Data Format (ADF) which implements an XML data structure through an email 802. Rather than sending the email 802 directly to the dealership's CRM system 808, however, it is sent to an intervening messaging service 804 which obtains the ADF-XML data 801 from the email 802 and provides it a messaging platform 806. The messaging platform 806 may be implemented, for example, with a unified messaging platform similar to platform 100 as described above, although any suitable platform may be utilized. This enables the messaging platform 806 to immediately initiate a conversation between the prospect and a sales rep at the dealership. The conversation may be initiated with an automatically generated message which is preferably customized to appear as though it has been sent by the sales rep as explained in more detail below.

The messaging platform 806 provides the intervening messaging service 804 with a link 803 to the conversation in the messaging platform 806. The intervening messaging service 804 inserts the link 803 to the conversation into the original email message 802, thereby creating a modified email 802A which is then forwarded to a sales rep at the dealership. The dealership may use a legacy CRM system 808, which may be, for example, DealerSocket or any other suitable CRM system. When the sales rep opens the modified email 802A, the sales rep can use the link to open the conversation in the messaging platform 806 and continue the conversation directly between the prospect and the sales rep.

One potential problem with immediately initiating a conversation with a prospect is determining which sales rep this particular prospect will be assigned to at the dealership. Therefore, in some embodiments, the messaging platform 806 also provides a replacement "from" address 805 to the intervening messaging service 804 which causes the modified email 802A to appear as though it originated from the replacement "from" address 805. The legacy CRM system 808 may then assign the sales lead to a sales rep based on the replacement "from" address. This enables the messaging platform 806 to assign sales lead prospects to different sales reps. This may be done, for example, in a round-robin fashion as is often done at auto dealerships. Since the messaging platform 806 thus knows in advance which sales rep the lead will be assigned to, it can automatically initiate a conversation with the prospect in a manner that is customized to both the prospect and the sales rep. Thus, for example, in the conversation shown on the right side of FIG. 27, the portion above the broken line 809 is engaged automatically by the messaging platform 806, while the portion below the broken line is directly between the prospect and sales rep, similar to that shown in FIG. 16 above. Since each sales rep's leads come from different email addresses, the CRM can be configured to reflect the sales rep assignments made in the communication platform, thereby synchronizing the CRM system 808 and the messaging platform 806. Alternatively, the messaging platform 806 may insert or modify other data in the email 802A such as the body, subject line, metadata, etc., to differentiate between different sales reps.

Figure 29:
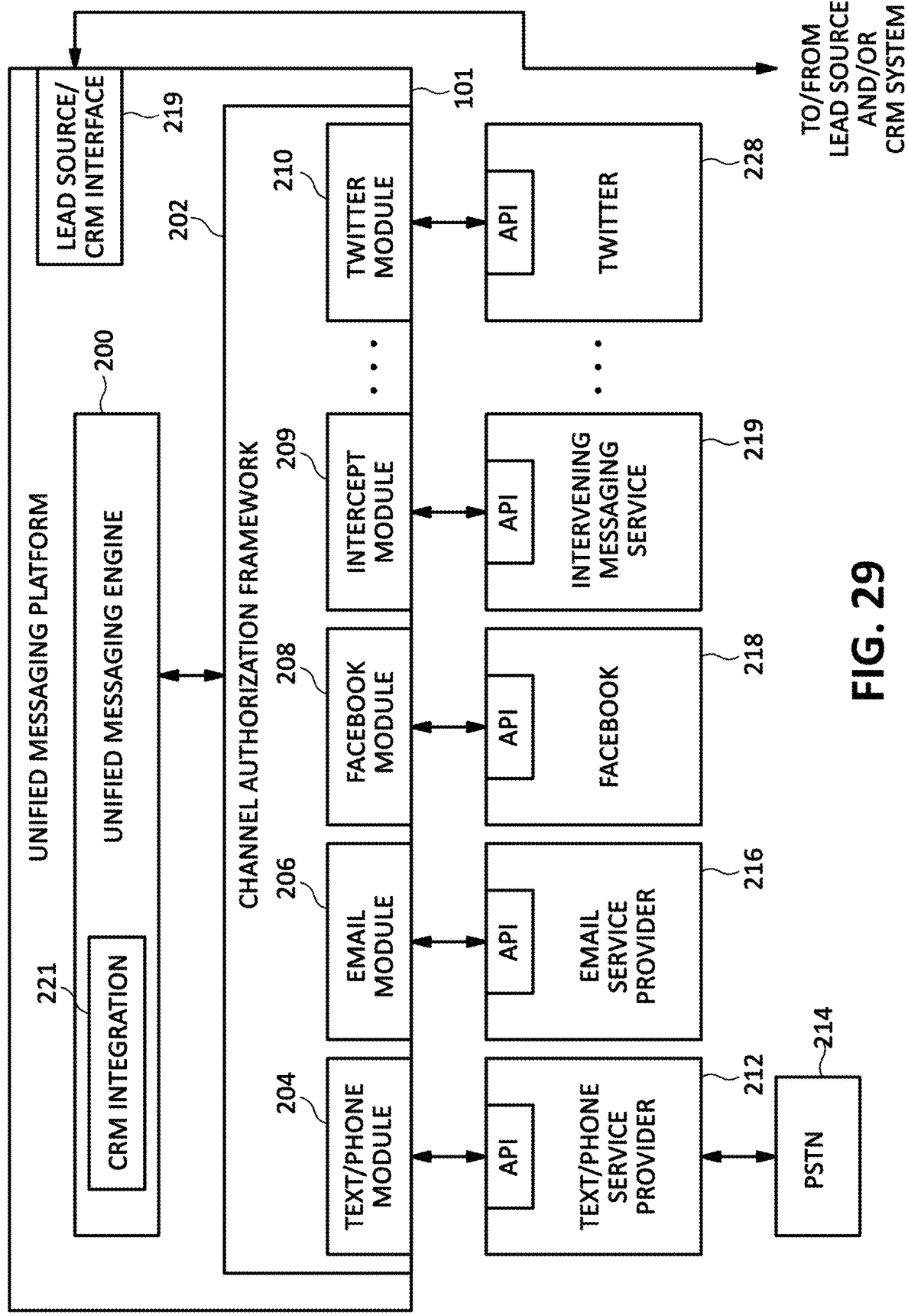
FIG. 29 illustrates an example implementation architecture for a unified messaging platform including functionality for intercepting messages from a sales lead source and integrating with a CRM system according to the inventive principles of this patent disclosure.

The intervening messaging service 804 may be implemented with any suitable combination of hardware/software/firmware. It may be implemented, for example, as an email client, possibly with customization to implement the insertion of the conversation link, replacement sender address, etc. Although the intervening messaging service 804 is shown as a separate component, it may alternatively be integrated into the messaging platform 806. For example, the sales lead source 800 may be configured or instructed to send sales lead emails 802 directly to the messaging platform 806. As another alternative, the messaging platform 806 may access an API of an intervening messaging service 219 as shown in FIG. 29, possibly by using an intercept module 209 as part of the channel authorization framework 202. As another alternative, the messaging platform 806 may access an API of the sales lead source 800. Also, although the intervening messaging service 804 is described in the context of email, other messaging and/or data transfer formats may be utilized.

Figure 28:
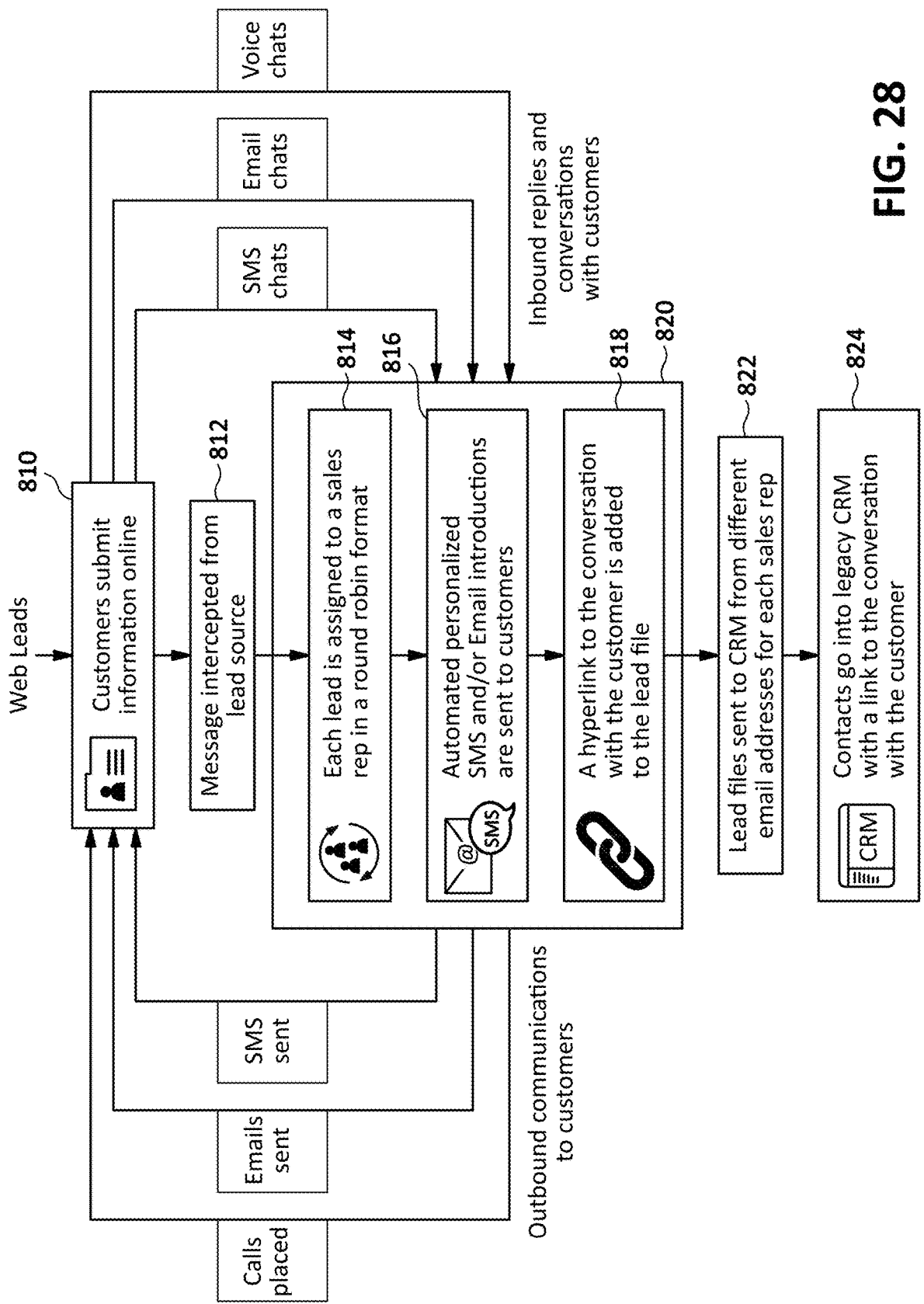
FIG. 28 illustrates an example embodiment of a workflow illustrating information, control and communication flow in as system according to the inventive principles of this patent disclosure.

FIG. 28 illustrates an example embodiment of a workflow illustrating information, control and communication flow in as system according to the inventive principles of this patent disclosure. The workflow begins at 810 when a prospective customer provides information expressing an interest a product or service into a portal, for example, an online portal such as KBB, TrueCar, etc. Although shown as a web lead, the information may be received in other formats, for example, in person through a kiosk. At 812, a message from the lead source, which may typically be intended for transmission a CRM system 824, is intercepted and redirected to a process, platform, or any other form of functionality 820 that may enable a messaging platform to integrate with a CRM system and perform the functions described therein. At 814, each incoming sales lead is assigned to a sales rep, which may be actual, virtual, or any other form. In the example embodiment, sales leads are assigned in a round-robin fashion, but they may be assigned based on demographic affinity, randomly, or in any other suitable manner. At 816, a personalized automated text and/or email message is sent to the prospective customer introducing the assigned sales rep. If the sales rep is available within an acceptably short period of time, the sales rep may further customize or personalize the message. At 818, a hyperlink to the conversation with the prospective customer in the messaging platform is generated and inserted in a lead file. At 822 one or more lead files are sent to a CRM system. Each lead file may be associated with a specific sales rep through a return email address or other indicator. At 824, the contact information along with the hyperlink to the conversation are entered into the CRM system. The features shown at 812 and 822 are shown separate from the features of 820, but in other embodiments they may be integrated.

The communications described above may be implemented through any of the text (SMS), email, and voice communications illustrated in FIG. 28, as well as through social media and/or any other communication channels. The message intervention methods and system are described herein in the context of a sales structure, but the inventive principles may also be applied to any other system for establishing contact with prospects to interact with such as government services, charities, etc.

FIG. 29 illustrates an example implementation architecture for a unified messaging platform including functionality for intercepting messages from a sales lead source and integrating with a CRM system according to the inventive principles of this patent disclosure. The system 101 of FIG. 29 may include any or all of the functionality of the system of FIG. 2, but may additionally include various features for implementing any of the functionality described with respect to FIGS. 27 and 28 above. For example, the unified messaging engine 200 may include CRM integration logic 221 which may implement any or all of the sales rep assignments, automated message generation, hyperlink generation and/or any other functionality described above. The platform 101 may include an intercept module 209 as part of the channel authorization framework 202 to interact with an intervening messaging service 219 through an API. Additionally, or alternatively, the platform 101 may include an interface 219 configured to enable the platform to communicate directly with a lead source and/or CRM system such as the lead source 800 and CRM system 808 in FIG. 27. The system of FIG. 29 may be implemented with any suitable combination of hardware, software, firmware, etc. For example, the system may be implemented as software as a service (SaaS) or as a platform as a service (PaaS), but the inventive principles are not limited to any particular implementation details.

In some embodiments, a system may include a intervening messaging service to receive a message having lead information, and a messaging platform configured to receive the lead information from the intervening messaging service and provide a link to a conversation to the intervening messaging service, wherein the intervening messaging service is adapted to insert the link into the message and forward the message to a CRM system. The messaging platform may be adapted to provide a replacement sender address to the intervening messaging service, and the intervening messaging service is adapted to cause the forwarded message to appear as though it was sent from the replacement sender address. The intervening messaging service and messaging platform may be integrated. The messaging platform may include a unified messaging platform.

In some embodiments, a method may include receiving a message having lead information, initiating a conversation with a prospect identified in the lead information, and sending a modified version of the message to a CRM system, wherein the modified version of the message includes information about the conversation. The information about the conversation may include a hyperlink to the conversation in a messaging platform. The method may further include assigning the prospect identified in the lead information to a representative. The modified version of the message may identify the representative. The representative may be identified by sender information in the modified message. The conversation may include a message to the prospect identified in the lead information. The message to the prospect may be automatically personalized to the prospect. The message having lead information may be intercepted between a lead source and a CRM system.

In some embodiments, a messaging platform may include a messaging engine and logic configured to receive a message having lead information, initiate a conversation with a prospect identified in the lead information, and send a modified version of the message to a CRM system, wherein the modified version of the message includes information about the conversation. The messaging platform may further include an interface to a lead source. The messaging platform may further include an interface to a CRM system. The messaging platform may further include an intercept module configured to access an API of an intervening messaging service.

Since the inventive principles of this patent disclosure can be modified in arrangement and detail without departing from the inventive concepts, such changes and modifications are considered to fall within the scope of the following claims.

The invention claimed is:

1. A computer-implemented method for synchronizing a legacy customer relationship management (CRM) system with a messaging platform, the method comprising:
   receiving, by an intervening messaging service operating on one or more servers, a first message having lead information, the lead information identifying a prospect user;
   receiving by a messaging platform from the intervening messaging service, the lead information identifying the prospect user;
   assigning, by the messaging platform, a representative user of the legacy CRM system for interacting with the prospect user;
   generating, by the messaging platform, a second message for interacting with the prospect user on behalf of the representative user of the legacy CRM system, the second message identifying a sender of the second message as the representative user of the legacy CRM system;
   initiating, by the messaging platform, a conversation with the prospect user identified in the lead information by sending the second message to the prospect user through a communication channel, the conversation initiated on behalf of the representative user of the legacy CRM system prior to the messaging platform providing the lead information to the representative user of the legacy CRM system;
   providing, by the messaging platform, a link to the conversation to the intervening messaging service;
   sending, from the intervening messaging service, a third message, including the link to the conversation, to the legacy CRM system;
   responsive to the legacy CRM system receiving from the intervening messaging service, the third message, extracting information identifying the representative user from the third message;
   assigning by the legacy CRM system, the prospect user to the representative user identified from the third message; and
   receiving, by the messaging platform, one or more messages from the representative user of the legacy CRM system for continuing the conversation with the prospect user via the link to the conversation, wherein the conversation comprises a sequence of messages including one or more messages automatically generated by the messaging platform on behalf of the representative user, followed by the one or more messages received from the representative user.

2. The method of claim 1 wherein the second message to the prospect user is automatically personalized to the prospect user.

3. The method of claim 1 wherein the first message having lead information is intercepted between a lead source and the legacy CRM system.

4. The method of claim 1, wherein the intervening messaging service assigns the representative user to the prospect user using one or more of (1) a round robin strategy applied to a plurality of representative users, (2) demographic affinity, or (3) randomly.

5. The method of claim 1, wherein the messaging platform provides a replacement from address to the intervening messaging service which causes the third message to appear as though it originated from the replacement from address.

6. The method of claim 5, wherein the legacy CRM system determines the representative user to be assigned to the prospect user by extracting the replacement from address of the third message.

7. The method of claim 1, wherein the conversation is performed via a communication channel comprising one or more of an email channel, a text messaging channel, a telephone connection, or a social media messaging channel.

8. A non-transitory computer readable storage medium storing instructions that when executed by one or more computer processors, cause the one or more computer processors to perform steps of a method for synchronizing a legacy customer relationship management (CRM) system with a messaging platform, the steps causing the one or more computer processors:
   receive, by an intervening messaging service operating on one or more servers, a first message having lead information, the lead information identifying a prospect user;
   receive by a messaging platform from the intervening messaging service, the lead information identifying the prospect user;
   assign, by the messaging platform, a representative user of the legacy CRM system for interacting with the prospect user;
   generate, by the messaging platform, a second message for interacting with the prospect user on behalf of the representative user of the legacy CRM system, the second message identifying a sender of the second message as the representative user of the legacy CRM system;
   initiate, by the messaging platform, a conversation with the prospect user identified in the lead information by sending the second message to the prospect user through a communication channel, the conversation initiated on behalf of the representative user of the legacy CRM system prior to the messaging platform providing the lead information to the representative user of the legacy CRM system;
   provide, by the messaging platform, a link to the conversation to the intervening messaging service;
   send, from the intervening messaging service, a third message, including the link to the conversation, to the legacy CRM system;
   responsive to the legacy CRM system receiving from the intervening messaging service, the third message, extract information identifying the representative user from the third message;
   assign by the legacy CRM system, the prospect user to the representative user identified from the third message; and
   receive, by the messaging platform, one or more messages from the representative user of the legacy CRM system for continuing the conversation with the prospect user via the link to the conversation, wherein the conversation comprises a sequence of messages including one or more messages automatically generated by the messaging platform on behalf of the representative user, followed by the one or more messages received from the representative user.

9. The non-transitory computer readable storage medium of claim 8, wherein the second message to the prospect user is automatically personalized to the prospect user.

10. The non-transitory computer readable storage medium of claim 8, wherein the first message having lead information is intercepted between a lead source and the legacy CRM system.

11. The non-transitory computer readable storage medium of claim 8, wherein the intervening messaging service assigns the representative user to the prospect user using one or more of (1) a round robin strategy applied to a plurality of representative users, (2) demographic affinity, or (3) randomly.

12. The non-transitory computer readable storage medium of claim 8, wherein the messaging platform provides a replacement from address to the intervening messaging service which causes the third message to appear as though it originated from the replacement from address.

13. The non-transitory computer readable storage medium of claim 12, wherein the legacy CRM system determines the representative user to be assigned to the prospect user by extracting the replacement from address of the third message.

14. The non-transitory computer readable storage medium of claim 8, wherein the conversation is performed via a communication channel comprising one or more of an email channel, a text messaging channel, a telephone connection, or a social media messaging channel.

15. A computer system comprising:
one or more computer processors; and
a non-transitory computer readable storage medium storing instructions that when executed by the one or more computer processors, cause the one or more computer processors to perform steps of a method for synchronizing a legacy customer relationship management (CRM) system with a messaging platform, the steps causing the one or more computer processors to:
receive, by an intervening messaging service operating on one or more servers, a first message having lead information, the lead information identifying a prospect user;
receive by a messaging platform from the intervening messaging service, the lead information identifying the prospect user;
assign, by the messaging platform, a representative user of the legacy CRM system for interacting with the prospect user;
generate, by the messaging platform, a second message for interacting with the prospect user on behalf of the representative user of the legacy CRM system, the second message identifying a sender of the second message as the representative user of the legacy CRM system;
initiate, by the messaging platform, a conversation with the prospect user identified in the lead information by sending the second message to the prospect user through a communication channel, the conversation initiated on behalf of the representative user of the legacy CRM system prior to the messaging platform providing the lead information to the representative user of the legacy CRM system;
provide, by the messaging platform, a link to the conversation to the intervening messaging service;
send, from the intervening messaging service, a third message, including the link to the conversation, to the legacy CRM system;
responsive to the legacy CRM system receiving from the intervening messaging service, the third message, extract information identifying the representative user from the third message;
assign by the legacy CRM system, the prospect user to the representative user identified from the third message; and
receive, by the messaging platform, one or more messages from the representative user of the legacy CRM system for continuing the conversation with the prospect user via the link to the conversation, wherein the conversation comprises a sequence of messages including one or more messages automatically generated by the messaging platform on behalf of the representative user, followed by the one or more messages received from the representative user.

16. The computer system of claim 15, wherein the second message to the prospect user is automatically personalized to the prospect user.

17. The computer system of claim 15, wherein the first message having lead information is intercepted between a lead source and the legacy CRM system.

18. The computer system of claim 15, wherein the intervening messaging service assigns the representative user to the prospect user using one or more of (1) a round robin strategy applied to a plurality of representative users, (2) demographic affinity, or (3) randomly.

19. The computer system of claim 15, wherein the messaging platform provides a replacement from address to the intervening messaging service which causes the third message to appear as though it originated from the replacement from address.

20. The computer system of claim 19, wherein the legacy CRM system determines the representative user to be assigned to the prospect user by extracting the replacement from address of the third message.

* * * * *